(12) United States Patent
Ferdous et al.

(10) Patent No.: US 8,901,027 B2
(45) Date of Patent: Dec. 2, 2014

(54) STABLE SLURRY BED FISCHER-TROPSCH CATALYST WITH HIGH SURFACE AREA AND ACTIVITY

(75) Inventors: Deena Ferdous, Houston, TX (US); Belma Demirel, Buffalo, NY (US)

(73) Assignee: Res USA, LLC, Los Angeles, CA (US)

( * ) Notice: Subject to any disclaimer, the term of this patent is extended or adjusted under 35 U.S.C. 154(b) by 0 days.

(21) Appl. No.: 13/881,930

(22) PCT Filed: Nov. 15, 2011

(86) PCT No.: PCT/US2011/060856
§ 371 (c)(1),
(2), (4) Date: May 3, 2013

(87) PCT Pub. No.: WO2012/068163
PCT Pub. Date: May 24, 2012

(65) Prior Publication Data
US 2013/0217569 A1    Aug. 22, 2013

Related U.S. Application Data

(60) Provisional application No. 61/415,578, filed on Nov. 19, 2010.

(51) Int. Cl.
*B01J 31/00* (2006.01)
*B01J 37/00* (2006.01)
(Continued)

(52) U.S. Cl.
CPC .............. *B01J 23/78* (2013.01); *B01J 23/745* (2013.01); *B01J 37/031* (2013.01); *C10G 2/332* (2013.01); *B01J 35/1019* (2013.01); *B01J 35/1042* (2013.01); *B01J 35/1061* (2013.01); *B01J 37/0045* (2013.01); *B01J 37/06* (2013.01)
USPC ........... 502/104; 502/113; 502/117; 502/326; 502/327; 502/328; 502/331; 502/336; 502/338; 502/345; 502/346; 423/592.1; 423/594.1; 423/594.2; 423/632; 423/633

(58) Field of Classification Search
CPC .......... B01J 37/03; B01J 37/031; B01J 23/70; B01J 23/72; B01J 23/74; B01J 23/745; B01J 23/78
USPC ......... 502/104, 113, 117, 326–328, 331, 336, 502/338, 345, 346; 423/592.1, 594.1, 423/594.2, 632, 633
See application file for complete search history.

(56) References Cited

U.S. PATENT DOCUMENTS 5,504,118 A    4/1996  Benham et al.
7,064,097 B1 *  6/2006  Cai et al. .................. 502/342
(Continued)

OTHER PUBLICATIONS

Search Report dated May 2, 2012 for corresponding International Application No. PCT/US2011/060856 (3 pgs.).
(Continued)

*Primary Examiner* — Cam N. Nguyen
(74) *Attorney, Agent, or Firm* — Timothy S. Westby; Porter Hedges, LLP

(57) ABSTRACT

A method of forming a Fischer-Tropsch catalyst by providing at least one metal nitrate solution, combining each of the at least one metal nitrate solutions with a precipitating agent whereby at least one catalyst precipitate is formed, and incorporating a strong base during precipitation, subsequent precipitation, or both during and subsequent precipitation. Catalysts produced via the disclosed method are also provided.

37 Claims, 12 Drawing Sheets

FIGURE 1

(51) Int. Cl.

| | | |
|---|---|---|
| *C08F 4/02* | (2006.01) | |
| *C08F 4/60* | (2006.01) | |
| *B01J 23/40* | (2006.01) | |
| *B01J 23/42* | (2006.01) | |
| *B01J 23/58* | (2006.01) | |
| *B01J 23/70* | (2006.01) | |
| *B01J 23/72* | (2006.01) | |
| *B01J 23/74* | (2006.01) | |
| *C01B 13/14* | (2006.01) | |
| *C01C 1/00* | (2006.01) | |
| *C01G 49/00* | (2006.01) | |
| *C01G 49/02* | (2006.01) | |
| *C01D 1/02* | (2006.01) | |
| *B01J 23/78* | (2006.01) | |
| *B01J 23/745* | (2006.01) | |
| *B01J 37/03* | (2006.01) | |
| *C10G 2/00* | (2006.01) | |
| *B01J 35/10* | (2006.01) | |
| *B01J 37/06* | (2006.01) | |

(56) References Cited

U.S. PATENT DOCUMENTS

| | | | | |
|---|---|---|---|---|
| 7,700,803 | B2 * | 4/2010 | Wessel et al. | 562/538 |
| 7,879,756 | B2 * | 2/2011 | Demirel et al. | 502/331 |
| 7,915,193 | B2 * | 3/2011 | Demirel et al. | 502/158 |
| 7,968,611 | B2 * | 6/2011 | Demirel et al. | 518/713 |
| 8,138,115 | B2 * | 3/2012 | Demirel et al. | 502/331 |
| 2002/0051747 | A1 | 5/2002 | Suzuki et al. | |
| 2004/0106517 | A1 * | 6/2004 | Dlamini et al. | 502/326 |
| 2006/0076299 | A1 * | 4/2006 | Feng et al. | 210/748 |
| 2009/0062108 | A1 * | 3/2009 | Demirel et al. | 502/158 |
| 2009/0069451 | A1 | 3/2009 | Demirel et al. | |
| 2009/0298678 | A1 * | 12/2009 | Demirel et al. | 502/201 |
| 2009/0298681 | A1 | 12/2009 | Nikrad et al. | |
| 2010/0112397 | A1 * | 5/2010 | Takatsu et al. | 429/19 |

OTHER PUBLICATIONS

Pichler et al., "Chemical and Thermomagnetic Studies on Iron Catalysts for Synthesis of Hydrocarbons," United States Department of Interior Bureau of Mines, Technical Paper 718, dated 1949 (60 pgs.).

Konig et al., "The Influence of Water and of Alkali Promoter on the Carbon Number Distribution of Fischer-Tropsc Products Formed over Iron Catalysts," Ber. Bunsenges. Phys. Chem. vol. 91, pp. 116-221, dated 1987 (24 pgs.).

International Preliminary Report on Patentability dated May 21, 2013 for corresponding International Application No. PCT/US2011/060856 (1 pg.).

Written Opinion dated May 2, 2013 for corresponding International Application No. PCT/US2011/060856 (4 pgs.).

Canadian Office Action dated Feb. 27, 2014 for corresponding Canadian Application No. 2,815,124 (3 pgs.).

* cited by examiner

STABLE SLURRY BED FISCHER-TROPSCH CATALYST WITH HIGH SURFACE AREA AND ACTIVITY

CROSS-REFERENCE TO RELATED APPLICATIONS

The present application is the U.S. national stage of international patent application number PCT/US2011/060856, filed Nov. 15, 2011, and claims the benefit thereof under 35 U.S.C. 119(a) and 35 U.S.C. 365(a), which application claims the benefit under 35 U.S.C. 119(e) of U.S. Provisional Patent Application No. 61/415,578 filed Nov. 19, 2010. The disclosure of each application is hereby incorporated herein by reference in its entirety.

STATEMENT REGARDING FEDERALLY SPONSORED RESEARCH OR DEVELOPMENT

Not Applicable.

BACKGROUND

1. Field of the Invention

The present invention relates generally to a catalyst for use in a slurry bed Fischer-Tropsch reactor. More particularly, the present invention relates to a method of making a Fischer-Tropsch catalyst with high activity, selectivity and stability. Still more specifically, the present invention relates to a method of producing a Fischer-Tropsch catalyst via precipitation with the addition of a strong base during or immediately following precipitation.

2. Background of the Invention

Fischer-Tropsch (FT) synthesis represents a catalytic method for the creation of synthetic liquid fuels. The reaction occurs by the metal catalysis of an exothermic reaction of synthesis gas, or syngas, which comprises carbon monoxide and hydrogen. Fischer-Tropsch (FT) technology is utilized to convert synthesis gas to valuable hydrocarbon products. The liquid product of the FT process is generally refined to produce a range of synthetic fuels, lubricants and waxes. Often, the FT process is performed in a slurry bubble column reactor (SBCR). The technology of converting synthesis gas originating from natural gas into valuable primarily liquid hydrocarbon products is referred to as Gas To Liquids (GTL) technology. When coal is the raw material for the syngas, the technology is commonly referred to as Coal-To-Liquids (CTL). Fischer-Tropsch technology is one of several conversion techniques included in the broader GTL/CTL technology.

The primary metals utilized as catalysts for FT conversion are cobalt and iron. Iron is favored due to a significantly lower cost. The quantity of catalyst available for catalysis in the reactor dictates the reaction product synthesized. Large scale Fischer-Tropsch reactors utilize complex systems to maintain nearly static quantities of catalyst within the reactor as a means to produce a constant output of product. Attrition, the degradation of the catalyst structure, is a major hurdle in improving FT reactor efficiency.

The physical integrity of unsupported precipitated iron catalyst suffers during slurry phase Fischer-Tropsch synthesis, degrading product quality (solids and iron content in wax) to such an extent that the run may have to be compromised or terminated. Other impacts may be on the wax upgrading, for example hydrogenation system, which is sensitive to the presence of catalytic metal (i.e. iron) in the feed stock. These negative impacts reduce time online for a reactor and increase costs for filtering product, maintaining the reactor, and overall production.

One of the primary difficulties encountered in using iron-based catalysts for carrying out the FT reaction in a slurry bubble column reactor (SBCR) is, therefore, the breakdown of the initial catalyst particles into very small particles, i.e. less than 5 micrometers (also referred to herein as 'microns') in size. Although the small particle size is advantageous for increasing surface area and reaction rate of the catalyst, problems arise in separating the small catalyst particles from the wax slurry medium. Separating the catalyst particles from the wax is necessary since, when operating under the most profitable conditions wherein wax is produced, removal of the wax (along with catalyst) from the reactor is required to maintain a constant height of slurry in the reactor.

Breakage of catalyst structure is mainly attributed to physical and chemical attrition. When the catalyst undergoes activation, the starting material, hematite, is converted to iron carbides which have different structures and density. The induced stresses from the transformation lead to particle breakage. Chemical attrition is associated with such structural changes during chemical transformation within the catalyst. Active phase transition from iron oxide to iron metal to iron carbide causes such chemical attrition. Additionally, if the FT reactor is operated at high temperature, e.g. greater than about 280° C., or at a low molar ratio of hydrogen to carbon monoxide, e.g. less than about 0.7, carbon formation via the Boudouard reaction can pry the particles apart. Mechanical action can cause breakup of the particles due to catalyst particles impinging each other or the reactor walls. Physical attrition is mainly contributed to this rubbing and collision of the catalyst particles, resulting in micron sized 'fines' material. Such attrition may lead to degradation of product quality (solids and iron content in the wax product) and other undesirable impacts on the wax hydrogenation system, which is generally sensitive to the presence of iron in the feedstock. Very fine material is difficult to settle in primary wax/catalyst separation units and the presence of ultrafines will complicate secondary filtration systems.

Accordingly, there is a need for a stable catalyst and a method of making same, wherein the catalyst exhibits resistance against breakdown while maintaining or enhancing desirable features of an iron catalyst, including high activity and selectivity toward high molecular weight (e.g. C5+) hydrocarbons. Such a catalyst should preferably also facilitate separation of the catalyst from the reaction product.

SUMMARY

Herein disclosed are a method of forming a Fischer-Tropsch catalyst and catalysts produced thereby. In embodiments, the method comprises providing at least one metal nitrate solution, combining each of the at least one metal nitrate solutions with a precipitating agent whereby at least one catalyst precipitate is formed, and incorporating a strong base during precipitation, subsequent precipitation, or both during and subsequent precipitation. In embodiments, the metal comprises iron. In embodiments, the iron nitrate solution comprises Fe(II)/Fe(III) at a desired ratio. In embodiments, the desired ratio of ferrous iron to ferric iron is about 1:3. In embodiments, the at least one metal nitrate solution further comprises at least one other metal in addition to iron, and the method further comprises co-precipitating at least one other metal or metalloid from the at least one metal nitrate solution. In embodiments, the at least one other metal comprises copper.

In embodiments, the method comprises providing at least two metal nitrate solutions, the method further comprising precipitating at least one other metal or metalloid from a second metal nitrate solution. In embodiments, the at least one other metal or metalloid is selected from the group consisting of magnesium, copper, aluminum, silicon, and combinations thereof. In embodiments, the second metal nitrate solution comprises copper nitrate.

The precipitating agent can be selected from the group consisting of $NH_4OH$, $(NH_4)_2CO_3$, $NH_4HCO_3$, NaOH, $Na_2CO_3$, $NaHCO_3$, KOH, $K_2CO_3$, $KHCO_3$, and combinations thereof. In embodiments, the strong base is selected from the group consisting of NaOH, KOH, $NH_4OH$ and combinations thereof. In embodiments, incorporating the strong base is the step immediately following precipitating. In embodiments, strong base is incorporated during precipitating.

In embodiments, the metal comprises iron, the precipitating agent comprises $Na_2CO_3$ and the strong base comprises NaOH. In embodiments, the method further comprises coprecipitating the at least one precipitate from a metal nitrate solution comprising both iron and copper or precipitating a first precipitate from an iron nitrate solution, precipitating a second precipitate from a copper nitrate solution, and combining the first and second precipitates. In embodiments, a catalyst produced via the disclosed method can comprise from about 1 to about 8 weight percent copper as a reduction promoter.

In embodiments, the method further comprises washing the precipitate and promoting the precipitate by contacting the precipitate with a promoter. In embodiments, the promoter comprises KOH. In embodiments, a catalyst produced by the disclosed method comprises from about 1 to about 20 weight percent potassium as chemical promoter.

The method can further comprise washing the at least one precipitate. The method can further comprise alkalizing the at least one precipitate with an alkaline material. In embodiments, the alkaline material comprises KOH. The method can further comprise promoting the at least one precipitate by contacting the precipitate with a structural promoter. In embodiments, the structural promoter comprises liquid potassium silicate, tetraethyl ortho silicate, or a combination thereof.

Also disclosed is a catalyst produced via any embodiment of the disclosed method. In embodiments, the catalyst is formed via an embodiment of the method wherein the metal comprises iron, the precipitating agent comprises $Na_2CO_3$ and the strong base comprises NaOH, and the method further comprises washing the precipitate and promoting the precipitate by contacting the precipitate with a promoter comprising KOH. In embodiments, the disclosed catalyst is a stable catalyst remaining stable online under FT operating conditions for a time on stream of at least about 100 hours. In embodiments, the catalyst comprises from about 20 to about 70 weight percent iron and from about 1 to about 20 weight percent potassium. In embodiments, the catalyst further comprises from about 1 to about 20 weight percent copper. In embodiments, the catalyst further comprises from about 0.5 to about 35 weight percent silica.

In embodiments, the disclosed catalyst comprises iron, copper, potassium and silica. In embodiments, the catalyst comprises, per 100 grams of iron, from about 3 to about 8 grams of copper, from about 3 to about 6 grams of potassium and from about 9 to about 25 grams of silica. The catalyst can comprise a weight ratio of about 100 iron to about 5 copper, 100 iron to about 4.2 potassium and 100 iron to about 12 silica. In embodiments, the catalyst comprises from about 1 to about 20 weight percent potassium as chemical promoter.

BRIEF DESCRIPTION OF THE DRAWINGS

For a more detailed description of the preferred embodiment of the present invention, reference will now be made to the accompanying drawings, wherein.

NOTATION AND NOMENCLATURE

Figure 1:
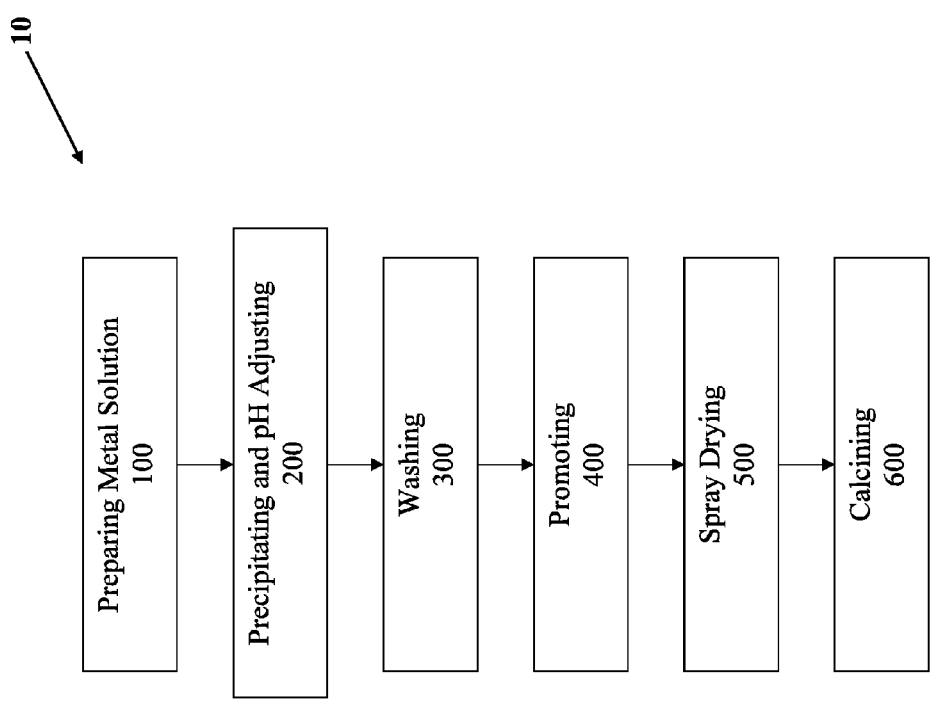
FIG. 1 is a flow chart of a method of preparing an FT catalyst according to an embodiment of this disclosure.

Certain terms are used throughout the following description and claims to refer to particular system components. This document does not intend to distinguish between components that differ in name but not function.

Attrition is the deterioration, degradation, break down or deconstruction of a particle. Sintering, as defined herein, is the process of adhesion, coalescence, aggregation, or combination of multiple catalyst particles to form a larger entity.

As used herein, the phrase 'C5+ selectivity' refers to the amount of liquid hydrocarbons containing five or more carbon atoms produced during Fischer-Tropsch synthesis. The C5+ selectivity is denoted in terms of the percentage of the liquid product that comprises hydrocarbons having at least five carbon atoms or may be expressed as kg C5+ hydrocarbons produced per hour per kg catalyst. The C5+ selectivity can be determined as the difference between the total hydrocarbons minus the sum of the C1 to C4 hydrocarbons divided by the sum total hydrocarbons.

As used herein, the phrase 'CO conversion' refers to the percentage of carbon monoxide in a syngas stream that is converted into FT product and is calculated as the difference between the inlet and outlet carbon monoxide concentrations divided by the inlet carbon monoxide concentration, or $$100*([CO]_{in}-[CO]_{out})/([CO]_{in}). \quad (1)$$

Similarly, the 'initial percent CO conversion at reaction' refers to the percent conversion within the first 100 hours of operation.

As used herein, the phrase, '$CH_4$ selectivity' or 'methane selectivity' refers to the difference between the inlet and outlet methane concentrations divided by the concentration of carbon monoxide converted into product, and is calculated by Eq. (2):

$$100*([CH_4]_{out}-[CH_4]_{in})/([CO]_{in}-[CO]_{out}). \quad (2)$$

As used herein, the phrase, '$CO_2$ selectivity' or 'carbon dioxide selectivity' refers to the difference between the inlet and outlet carbon dioxide concentrations divided by the concentration of carbon monoxide converted into product and is calculated by Eq. (3):

$$100*([CO_2]_{in}-[CO_2]_{out})/([CO]_{in}-[CO]_{out}). \quad (3)$$

As used herein, the phrase 'Horiba median size' refers to the middle value of the given numbers or distributions in ascending order. It is the average value of the two middle elements.

As used herein, the '$d_{32}$ size' refers to the total volume of the particles divided by the total cross sectional area of the particles:

$$d_{32}=6V_p/A_p. \quad (4)$$

As used herein, the 'mean size' refers to the diameter of a sphere that has the same volume to surface area ratio as a particle of interest. The mean or average is the sum of the sizes of all the elements divided by the total number of elements.

As used herein, when referring to a FT catalyst, the term 'stable' refers to a carbon monoxide conversion which is substantially steady for at least 200 h.

As used herein, the term 'fines' refers to catalyst particles having an average particle size of less than or equal to 10 μm.

DETAILED DESCRIPTION

I. Overview

Herein disclosed is a Fischer-Tropsch catalyst and a method for making same, the catalyst being a stable, active and high surface area precipitated iron catalyst. It was unexpectedly discovered that when strong base (e.g. NaOH) is added during and/or subsequently to the precipitation step of catalyst preparation, the surface area of the catalyst increases. This increase in surface area improves the activity and/or stability of the resulting catalyst. Unexpectedly, addition of strong base after the precipitation step also results in a catalyst that exhibits enhanced performance. For example, the activity and/or stability of the disclosed catalyst is increased when strong base is added during and/or subsequently to precipitation to adjust the pH of the precipitate slurry. As discussed further hereinbelow, strong base may be added to raise the pH of the precipitate slurry to a pH in the range of from about 9 to about 13.5, from about 10 to about 13.5 or from about 10.5 to about 13.5. In embodiments, the high surface area and high activity of the disclosed catalysts reduces catalyst usage during commercial application.

II. Method of Preparing FT Catalyst

The herein disclosed method of preparing a FT catalyst will now be described with reference to FIG. 1. FIG. 1 is a flow chart of a method 10 of preparing an FT catalyst according to an embodiment of this disclosure. Method 10 comprises preparing a catalytic metal solution at 100, precipitating and pH adjusting at 200, washing at 300, promoting at 400, spray drying at 500 and calcining at 600.

IIA. Preparing Metal Solution.

Catalyst preparation method 10 comprises preparing at least one metal solution at 100. Preparing at least one metal nitrate solution can comprise preparing an iron nitrate solution, preparing a copper nitrate solution, preparing a solution comprising iron nitrate and at least one other metal nitrate, and combinations thereof.

In embodiments, preparing at least one metal nitrate solution comprises preparing a solution comprising iron nitrate. The iron nitrate may comprise Fe(II) and Fe(III) nitrates. The iron nitrate solution may comprise a desired weight ratio of Fe(II)/Fe(III). In embodiments, the desired ratio of ferrous iron to ferric iron in the metal nitrate solution is about 1:3. In embodiments, preparing at least one metal solution at 100 comprises preparing at least one metal nitrate solution comprising at least one other metal in addition to iron. In embodiments, the at least one other metal comprises copper. In embodiments, preparing at least one metal solution at 100 comprises preparing at least one metal nitrate solution comprising copper nitrate (cupric and/or cuprous nitrate) and iron nitrate (ferrous and/or ferric nitrate).

In embodiments, preparing at least one metal solution at 100 comprises preparing at least two metal nitrate solutions. In embodiments, preparing at least one metal nitrate solution comprises preparing a ferrous nitrate solution, preparing a ferric nitrate solution, preparing a copper nitrate solution, or a combination thereof and combining at least portions of said solutions prior to precipitation. As mentioned above, the copper nitrate solution comprises, in embodiments, cuprous nitrate, cupric nitrate or a combination thereof.

The metal nitrate solution(s) can be formed by combining metal powder with a solvent. The solvent can comprise water (e.g. distilled water). In embodiments, the catalytic metal solution is prepared by slurrying iron powder and copper powder with deionized or 'DI' water and combining with nitric acid or nitric acid solution. In embodiments, the catalytic metal solution is prepared by slurrying iron powder and copper powder with deionized or 'DI' water and adding nitric acid or aqueous nitric acid solution thereto. The nitric acid may be added as a nitric acid solution comprising nitric acid in water. The slurry can be mechanically or otherwise stirred during combination with or addition of nitric acid or nitric acid solution. The nitric acid may be added dropwise, as the dissolution reaction is exothermic and the addition can be controlled based on reaction temperature. Addition and/or combination of acid and base may be controlled such that the reaction temperature does not exceed about 25° C., 30° C., or 35° C. Intermittent cooling may be utilized to control the reaction. In embodiments, when approximately 80% of the nitric acid is added, a dark green solution is formed. In embodiments, the solution is heated to a desired heating temperature over a heating time and held there for a desired holding time. In embodiments, the solution is heated to a heating temperature of up to or about 70° C. The solution can be heated to said temperature at a controlled rate, for example, at a rate of about 0.5° C. to about 3° C./min, or at a rate of about 3° C./min. Once said heating temperature is attained, the heated solution may be maintained at said heating temperature for a holding time. The holding time may be, for example, up to or about 45 minutes. In embodiments, just above 65° C., NOx gases with reddish-brown color are produced for several minutes. During the heating and/or holding time, the mixture may change color from a dark green to a red/brown color.

IIB. Precipitating and pH Adjusting.

Catalyst preparation method 10 further comprises precipitating and pH adjusting at 200. In embodiments, precipitating and pH adjusting 200 comprises combining each of the at least one metal nitrate solutions of IIA with a precipitating agent whereby at least one catalyst precipitate is formed. The precipitating agent can be selected from the group consisting of $NH_4OH$, $(NH_4)_2CO_3$, $NH_4HCO_3$, $NaOH$, $Na_2CO_3$, $NaHCO_3$, $KOH$, $K_2CO_3$, $KHCO_3$, and combinations thereof. Precipitation can be performed by the addition of acid to base or by the addition of base to acid, i.e. by the addition of metal solution to precipitating agent, by the addition of precipitating agent to metal solution from IIA or by the co-feeding of acid and base. In embodiments, the precipitating agent is selected from the group consisting of $Na_2CO_3$, $NH_4OH$, NaOH, KOH and combinations thereof. In embodiments, the precipitating agent is selected from the group consisting of $Na_2CO_3$, $NH_4OH$ and combinations thereof. In embodiments, the precipitating agent comprises sodium carbonate. In embodiments, the precipitating agent comprises ammonium hydroxide. In embodiments, the precipitating agent comprises sodium hydroxide. In embodiments, the precipitating agent comprises potassium hydroxide. In embodiments, the precipitating agent is an aqueous sodium carbonate solution having a concentration in the range of from about 40 g/L to about 130 g/L, from about 100 g/L to about 130 g/L or from about 100 g/L to about 120 g/L. In embodiments, the precipitating agent is an aqueous ammonium hydroxide solution having a concentration in the range of from about 130 g/L to about 160 g/L, from about 140 g/L to about 160 g/L or from about 150 g/L to about 160 g/L.

Precipitating agent may be combined with metal solution(s) such that the concentration of precipitating agent in the precipitation slurry is in the range of from about 45 to about 60, from about 50 to about 60 or from about 55 to about 60. In embodiments, sodium carbonate is utilized as precipitating agent and is combined with a metal nitrate solution such that the concentration of sodium carbonate in the precipitating slurry is in the range of from about 4.6 to about 6.6, from about 5.1 to about 6.6 or from about 6.1 to about 6.6. In embodiments, ammonium hydroxide is utilized as precipitating agent and is combined with a metal nitrate solution such that the concentration of the precipitating slurry is in the range of from about 10 to about 25, from about 15 to about 25 or from about 20 to about 25.

It has been unexpectedly discovered that addition of strong base during or subsequent to the precipitation improves stability, activity and/or selectivity of the resulting FT catalyst. In embodiments, strong base is added during precipitation. In embodiments, strong base is added after precipitation. The strong base can be selected from the group consisting of NaOH, KOH, $NH_4OH$, and combinations thereof. In embodiments, the strong base comprises NaOH. In embodiments, strong base is added during precipitation with sodium carbonate precipitating agent. In embodiments, strong base comprising NaOH is added during precipitation with sodium carbonate precipitating agent. In embodiments, strong base is added during precipitation to keep the pH of the precipitation solution(s) relatively constant. For example, strong base may be added during precipitation to maintain the pH of the precipitation solution at a pH in the range of from about 8 to about 10, from about 8.5 to about 9.5, from about 8.7 to about 9.3, or to a pH of about 9.

In embodiments, strong base is added after precipitation. In embodiments, strong base is added immediately following precipitation. In embodiments, strong base is added prior to promotion. For example, following precipitation, the pH of the precipitated slurry can be adjusted as desired by the addition of strong base. In embodiments, addition of strong base subsequent precipitation is utilized to adjust the pH of the precipitated slurry to a pH in the range of from about 9 to about 13.5, from about 10 to about 13.5, from about 10.5 to about 13.5, or to a pH of about 9.5, 10, 10.5, 11, 12, 12.5, 13 or about 13.5.

IIC. Washing.

Catalyst preparation method 10 further comprises washing at 300. Washing is performed by rinsing with wash fluid until the pH of the wash fluid is in the range of from about 6 to about 7 or about 6.5. In embodiments, the wash fluid comprises water. In embodiments, the wash fluid comprises deionized water. In embodiments, the washing is continued until the conductivity of the wash fluid is less than about 40 micro-siemens. In embodiments, multiple washing steps are incorporated. When sodium carbonate is utilized as precipitating agent, washing may serve to remove sodium from the precipitate. When ammonium hydroxide is utilized as precipitating agent, washing may serve to remove $NO_3$ from the $NH_4OH$ precipitated slurry.

As catalyst preparation method 10 can involve rigorous washing of the precipitate, purification and recycling of wash water may be incorporated into the method to minimize the amount of waste water to be managed. In embodiments, the average particle size of the precipitate can change from about 1 micron to about 30 microns.

IID. Promoting.

Catalyst preparation method 10 further comprises promoting the precipitated catalyst slurry from IIC. Promoting can comprise combining the precipitated catalyst slurry from IIC with a support solution.

The support solution comprises at least one chemical promoter. In embodiments, the at least one chemical promoter comprises a highly alkaline base. In some embodiments, the chemical promoter comprises a hydroxide of an alkali metal. In embodiments, the base is selected from the group consisting of potassium hydroxide, sodium hydroxide, ammonium hydroxide, and combinations thereof. In embodiments, the alkali hydroxide comprises KOH, NaOH, or a combination thereof. In embodiments, the support solution comprises KOH chemical promoter.

The support solution can further comprise at least one structural promoter/support. In embodiments, the support solution comprises alkali-silica and the precipitated catalyst slurry from IIC is a precipitated iron slurry. The precipitated iron slurry may comprise an iron hydroxide slurry. In embodiments, precipitated iron catalyst is impregnated with an alkali-silica solution. In embodiments, the precipitated iron solution comprises an unsupported hydroxide (e.g. sodium hydroxide or ammonium hydroxide) precipitated catalyst solution. In embodiments, the precipitated iron solution comprises carbonate (e.g. sodium carbonate) precipitated catalyst solution. When combining a carbonate precipitated system with a potassium silicate support solution, the resulting catalyst may have a higher BET surface area when compared to hydroxide-precipitated catalyst. In embodiments, the average particle size of the slurry can change from about 1 micron to about 35 microns.

In embodiments the catalyst slurry from IIC (i.e. the iron slurry) to be impregnated has a pH higher than 7, higher than 8, higher than 9, higher than 10, higher than 11, or higher than 12. In embodiments, the iron slurry to be impregnated has a pH of about neutral. In embodiments, upon the addition of the support solution to the iron catalyst slurry, the catalyst pH is readjusted to about neutral. In embodiments, upon the addition of the support solution to the iron catalyst slurry, the catalyst pH is not adjusted to about neutral. Without wishing to be limited by theory, it is posited that the silicate of an alkali-silicate support solution in some way forms a strong interaction with the iron oxide of a precipitated iron catalyst transferring this bond strength to the activated iron (e.g. iron carbide or iron oxide) species of the resulting promoted catalyst.

In embodiments, the support solution comprises at least one structural promoter/support and at least one chemical promoter. In embodiments, the support solution prepares promotional species selected from silica and alumina. In embodiments, promoting at 400 comprises double promotion, i.e. employs double promotion in a one step promoting process. In such embodiments, addition of structural promoter (e.g. $SiO_2$, $TiO_2$ or $Al_2O_3$) and chemical promoter (e.g. K added as KOH, $K_2CO_3$ and/or $KHCO_3$) is preformed in a single step. In embodiments, the support solution further comprises controlled quantities of water. In embodiments, a liquid form of silica (e.g. is employed as structural promoter), and the chemical promoter comprises KOH, $K_2CO_3$ and/or $KHCO_3$. In embodiments, a solid form of silica is employed as structural promoter (e.g. Cab-O-Sil) and the chemical promoter consists essentially of KOH.

As mentioned above, in embodiments, the support solution comprises at least one structural promoter. In embodiments, the at least one structural promoter is selected from the group consisting of crystalline silica, alumina, magnesia, boehmite, amorphous (e.g. fumed) silica, and combinations thereof. In embodiments, the structural promoter is selected from alumina, silica, silicic acid, activated carbon, zirconium oxide, magnesium oxide and combinations thereof. In embodiments, the structural promoter comprises crystalline silica or mixtures of crystalline silica and silicic acid. In embodiments the support solution comprises more than one structural promoter. For example, in embodiments, the support solution comprises crystalline silica with at least one additional structural promoter selected from the group consisting of boehmite, fumed silica, alumina, zeolite, $MgAl_2O_4$, activated carbon, zirconium oxide and combinations thereof.

In embodiments, the support solution is formed by creating a suspension of structural promoter in a solution of chemical promoter. In embodiments, water is added to the chemical promoter solution and/or to the structural promoter. In embodiments, the water is distilled water. In embodiments, water is added to create a stirrable slurry of the at least one structural promoter. In embodiments, the at least one structural promoter or the at least one structural promoter and water is mixed for a time of from about 5 minutes to about 24 hours to ensure dissolution of the structural promoter therein. In embodiments, the at least one structural promoter or the at least one structural promoter and water is mixed for a time of from about 5 minutes to about 10 minutes prior to being added to the at least one chemical promoter.

In embodiments, after water and structural promoter are well mixed, the mixture is added to a potassium hydroxide solution (e.g. aqueous KOH such as 45 wt % KOH). The chemical promoter solution can comprise aqueous potassium hydroxide containing from about 10 to about 45 weight percent KOH, from about 20 to about 45 weight percent KOH, from about 30 to about 45 weight percent KOH, from about 40 to about 45 weight percent KOH, or about 35, 40, or 45 weight percent KOH. In embodiments, the support solution is created by co-mixing potassium hydroxide (KOH) or KOH solution with crystalline silica (e.g. SIL-CO-SIL-75 from U.S. Silica Company). In embodiments, an aqueous solution of structural promoter is added to chemical promoter solution and stirred for a time of from about 5 minutes to about 24 hours. In some embodiments, an aqueous solution of structural promoter is added to chemical promoter solution and stirred for a time of from about 5 minutes to about 10 minutes. In embodiments, an aqueous solution of structural promoter is added to chemical promoter solution and stirred for a time of from about 10 minutes to about 20 minutes. In embodiments, the stirring is performed at substantially room temperature. In embodiments, the stirring is performed while heating. In embodiments, the stirring is performed at a temperature of at least or about 40° C. In embodiments, the stirring is performed at a temperature in the range of from about 50° C. to about 100° C.

As discussed hereinabove, in embodiments, the structural promoter/support solution comprises an alkali-silicate solution. In embodiments, depending on the moisture content, the support solution comprises an alkali-silicate-hydrate gel (the $OH^-$ as well as the pH decreases as the silica dissolves). The support solution may be properly classified as a mixture, a suspension, or a colloid, in various embodiments.

In embodiments, the dissolution of structural promoter (e.g. $SiO_2$) is enhanced by adding the structural promoter slowly, in small portions, to the chemical promoter, e.g. KOH, solution. In these embodiments, whenever a portion of structural promoter (e.g., silica) has 'dissolved' into the chemical promoter, a next portion is added.

In embodiments, the support solution has a pH in the range of from about 6 to about 14. In embodiments, the support solution has a pH in the range of from about 6 to about 14, from about 7 to about 14, from about 10 to about 11 or from about 10 to about 10.5. In embodiments, the pH of the support solution is less than or about 10.5. In embodiments, the pH of the support solution is greater than or about 10. Without wishing to be limited by theory, above a pH of 6 or 7 and up to a pH of about 10.5 (where silica begins to dissolve as silicate=Si), silica particles are negatively charged and repulse each other. The particles thus do not collide and particle growth continues without aggregation. Desirably, salt is excluded from the support solution, as the presence of salt would tend to reduce the charge repulsion and aggregation/gelling could be expected occur. In embodiments, the support solution does not comprise a significant concentration of salt. At lower pH values, silica particles bear little ionic charge and may undesirably collide and aggregate into chains and then gel networks. In embodiments, an acid is added to adjust the pH of the support solution. In some embodiments, nitric acid is added to adjust the pH of the support solution into the range of from about 6 or 7 to a pH of about 14.

In embodiments, the support solution is prepared at room temperature. In embodiments, the support solution is prepared at a desired temperature for facilitation of dissolution. In embodiments, the support solution is prepared at a temperature in the range of from about 45° C. to about 50° C. In embodiments, the support solution is prepared at a temperature in the range of from about 75° C. to about 95° C.

In embodiments, the support solution further comprises a peptizing agent. In embodiments, the peptizing agent is selected from nitric acid, acetic acid, ammonium hydroxide, aqueous solutions thereof, and combinations thereof. In embodiments, the support solution comprises a lyophobic sol, which is dispersed to reduce a mass to colloidal size or colloidal particles built from molecules via condensation. In both cases, a peptizing agent may be added to stabilize the sol. The peptizing agent can supply ions that will be adsorbed on the particles resulting from dispersion or condensation to provide the particles with a stabilizing charge. In embodiments, the peptizing agent comprises OH⁻ ion, which may be supplied by alkali(s). In embodiments, the structural promoter comprises alumina. In embodiments, the structural promoter comprises alumina and the support solution comprises a dispersion or sol comprising water, alumina (e.g. boehmite), and optionally peptizing agent (e.g., an acid such as nitric acid). In embodiments, the peptizing agent comprises acetic acid.

In embodiments, the structural promoter/support is carefully added to a chemical promoter solution over a time of from about 5 minutes to about 24 hours. On addition of the final portion of structural promoter/support, the mixture may thicken to an undesired extent. In such embodiments, the consistency of the final support solution may be adjusted with water (e.g. distilled water) to reslurry the mixture, which may then be stirred for a time. Stir time may be in the range of from about 5 minutes to about 24 hours.

In embodiments, preparation of the support solution allows for an extended structural promoter/support dissolution period. For example, in embodiments, the mixture is stirred overnight.

In embodiments, following combination with (e.g. addition of) chemical promoter (e.g. alkali hydroxide solution), the support solution is heated. In embodiments, the support solution is heated to a mild temperature. In embodiments, the support solution is not heated, but is immediately added to a precipitated catalyst slurry. For example, in embodiments, the support solution is added to an iron hydroxide slurry. In alternative embodiments, after addition of the chemical promoter, the support solution is heated and then added to a catalyst slurry. In specific embodiments, the support solution is heated to a temperature in the range of from about 40° C. to about 60° C. In embodiments, the support solution is heated to a temperature of about 45° C. overnight. Without wishing to be limited by theory, it is postulated that this heating may increase the rate of dissolution of structural promoter (e.g. silica). In embodiments, the support solution is mixed and heated at a temperature in the range of from about 40° C. to about 70° C. In embodiments, an alkali-silica solution is oven dried (for example, at a temperature of about 100° C.) overnight.

In embodiments, a heated support solution is added to an iron hydroxide slurry comprising iron hydroxide precipitate. In embodiments, an alkali-silica support solution is diluted into an iron hydroxide slurry. As mentioned hereinabove, in embodiments employing double promoting at 400, the chemical promoter (typically potassium) and structural promoter(s) (typically silica and/or alumina) are added in a single step to a precipitated catalyst (e.g. iron) slurry. The slurry solid content and the viscosity can be in the range of from about 10% to about 30% and from about 100 centipoise to about 5000 cP, respectively.

In embodiments, double promoting at 400 comprises $SiO_2$-KOH alkali silicate promotion. In embodiments, fumed silica is added in a controlled manner (e.g. slowly and/or in portions), to a chemical promoter solution such as potassium hydroxide solution (i.e. KOH dissolved in DI water), ensuring adequate dispersion and minimization/avoidance of lump formation. The support solution can subsequently be well mixed for a time, for example, for a time of up to or about 24 hours. The mixed support solution is then be added to a washed filter cake slurry from IIC.

IIE. Spray Drying.

Catalyst preparation method 10 may further comprise spray drying. In embodiments, the promoted catalyst from IID is dried by any means known to those of skill in the art. In embodiments, uncalcined catalyst particles are dried by heating at 100° C. In embodiments, the promoted catalyst from step 400 is spray dried at step 500. Spray drying as defined herein, is the process of drying a liquid feed through a hot gas. In embodiments the material introduced into the spray dryer is a solution, a colloid, or a suspension. Methods known to those of skill in the art may be used to spray dry catalyst particles prepared according to this disclosure. For example, a NIRO spray dryer may be used to perform spray drying. In embodiments, spray drying at 500 is performed utilizing a Type H, MOBILE NIRO spray dryer comprising a two-fluid nozzle atomizer, a drying chamber, an air disperser, a chamber, a product collection section, air ducts, a cyclone, an exhaust fan, an air heater and an instrument panel.

Desirably, the spray dried catalyst particles are smooth substantially round (or spherical) catalyst particles. In embodiments, the spray dried catalyst particles are rough and/or non spherical, catalyst particles. Smooth, round particles are desirable because such particles inhibit catalyst attrition due to increased particle density. In addition to contributing structural integrity, the presence of structural promoter/support (e.g. silica) may assist in spraying smooth round catalyst particles. The density of sprayed particles depends upon the solids content of the feed to be spray dried. The slurry solids content of the slurry fed to the spray dryer may be adjusted to provide a desired spray dried particle size and/or particle size distribution (PSD). In embodiments, the catalyst slurry fed to a spray dryer has a solids content in the range of from about 10% to about 30%. In embodiments, the catalyst slurry fed to a spray dryer has a solids content in the range of from about 0.5% to about 12.5%. In embodiments, the slurry solids content fed to the spray dryer is about 16±1%. In embodiments, a surfactant is added to decrease the viscosity of the catalyst slurry to be spray dried. The surfactant may be selected from alcohols. In embodiments, at least one surfactant is added to the catalyst slurry to improve the spray drying. In embodiments, the surfactant is polyvinyl alcohol.

In embodiments, the water setup flow is in the range of from about 4.0 to about 4.5 kg/hr. The feed flow may be set with water and subsequently switched to actual feed slurry. In embodiments, the atomizer air flow is in the range of from about 4675 RPM to about 7590 RPM. In embodiments, the atomizer air flow is about 1 bar with a 30% setting on a variable area flow meter.

In embodiments, a catalyst slurry is introduced through a nozzle from the bottom and drying air cross flows from the top. In embodiments, the inlet temperature of the spray dryer is in the range of from about 350° C. to about 370° C. In embodiments, the inlet temperature is about 370° C. (±2). In embodiments, the outlet temperature of the spray dryer is in the range of from about 75° C. to about 120° C. or from about 80° C. to about 120° C. In embodiments, the outlet temperature is about 75±2.0° C.

In embodiments, the spray dryer outlet temperature is controlled at a temperature of from 90° C. to about 110° C. In embodiments, the spray dryer temperature is controlled at a temperature of from 95° C. to about 100° C. In some embodiments, the spray dryer temperature is controlled at a temperature of from about 104° C. to about 108° C.

In embodiments, spray drying is performed with a Type H Mobil Niro Spray Dryer. Such a spray dryer comprises a two-fluid nozzle atomizer, drying chamber, air disperser, main chamber, product collection section, air ducts, cyclone, exhaust fan, air heater, and instrument panel. A feed slurry can be introduced to the spray dryer through a nozzle from the bottom with drying air cross-flowing from the top. The feed slurry can comprise from about 10 to about 30 weight percent solids, from about 12 to about 20 weight percent solids, from about 20 to about 25 weight percent solids, or about 8, 9, 10, 11, 12, 13, 14, 15, 16, 17, 18, 19, 20, 21, 22, 23, 24 or 25 weight percent solids. In embodiments, the solids content of the slurry prior to addition of promoter is in the range of from about 10 wt % to about 20 wt %, or about 8, 9, 10, 11, 12, 13, 14, 15, 16, 17, 18, 19 or 20 wt %. In embodiments, the solids content of the slurry after addition of promoter is in the range of from about 10 wt % to about 20 wt %, or about 8, 9, 10, 11, 12, 13, 14, 15, 16, 17, 18, 19 or 20 wt %.

The spray drying conditions can comprise an inlet temperature in the range of from about 350° C. to about 450° C. or about 350° C., 360° C., 370° C., 380° C., 390° C., 400° C., 410° C., 420° C., 430° C., 440° C. or 450° C. The outlet temperature can be in the range of from about 70° C. to about 100° C. or about 70° C., 73° C., 75° C., 77° C., 80° C., 85° C., 90° C., 95° C., 96° C. The water setup flow can be about 4.0 to 4.5 kg/hr (feed flow can be set with water and subsequently switched to the actual slurry feed). The atomizer air flow can be about 1 bar with a 30% setting on a variable area flow meter. Coarse and fine samples can be collected.

In embodiments, the spray-dried particles have a Gaussian type particle size distribution (PSD). In embodiments, a precipitated catalyst slurry is spray dried to provide microspheric particles in the size range of 30-150 micrometers. In embodiments, the mean particle size of the spray-dried catalyst is in the range of from about 30 to about 90 μm or in the range of from about 40 μm to about 100 μm. In embodiments, the mean particle size is in the range of from about 38 μm to about 80 μm. In embodiments, the mean particles size is in the range of from about 36 μm to about 48 μm. In embodiments, the spray-dried catalyst particles have an average particle size of about 80 micrometer.

The utilization of a support solution comprising silica at promoting step 400 may assist in creating smooth round catalyst particles that exhibit minimal attrition during usage. As silica content has an impact on mean particle size, in embodiments, the spray drying parameters are redefined for each change in catalyst composition to yield spray-dried catalyst particles having a desired PSD.

IIF. Calcining.

Catalyst preparation method 10 may further comprise calcining at 600. To minimize aging, spray dried catalyst may be calcined immediately following spray drying, in embodiments. In embodiments, the spray dried catalyst from 500 is calcined at a temperature in the range of from about 200° C. to about 600° C., from about 280° C. to about 600° C., from about 300° C. to about 600° C. or from about 200° C. to about 400° C. In embodiments, spray dried catalyst from 500 is calcined at a temperature in the range of from about 300° C. to about 380° C. In embodiments, spray dried catalyst from 500 is calcined at a temperature of about 300° C. In embodiments, spray dried catalyst from 500 is calcined at a temperature of about 320° C. In embodiments, spray dried catalyst from 500 is calcined at a temperature of about 380° C. Calcination may be performed for a time period in the range of from about 4 to about 10 hours. In embodiments, the spray dried catalyst from 500 is calcined by heating to a temperature of about 380° C. by heating at a rate of 30° C. per minute and calcined for 4 hours. In embodiments, the spray dried catalyst from 500 is calcined by heating to a temperature of about 380° C. by heating at a rate of about 1° C. per minute and calcined for 4 hours. In embodiments, the spray dried catalyst from 500 is calcined by heating to a temperature of about 300° C. by heating at a rate of from about 0.5° C. per minute to about 2° C. per minute. The spray dried catalyst from 500 may be calcined at the calcination temperature for about 4 hours. In embodiments, the spray dried catalyst from 500 is calcined by heating to a calcination temperature by heating at a rate in the range of from about 1° C. to about 30° C. per minute and calcined for a calcination duration. In embodiments, the heating rate is in the range of from about 0.5° C./min to about 25° C./min, from about 1° C./min to about 20° C./min or from about 1° C./min to about 15° C./min, from about 1° C./min to about 10° C./min, from about 1° C./min to about 9° C./min or from about 1° C./min to about 8° C./min, 7° C./min, 6° C./min, 5° C./min, 4° C./min, 3° C./min or 2° C./min. In embodiments, the spray dried catalyst from 500 is calcined in an oven, in atmosphere. As known in the art, spray dried catalyst may be calcined in, for example, a porcelain crucible.

In embodiments, the precipitated particles are stabilized (prestabilized) by heating to a temperature lower than the calcination temperature prior to calcination. In embodiments, the spray dried catalyst is prestabilized at a temperature below the temperature at which phase related changes/structuring take place [this may, for example, be determined by differential temperature analysis (DTA) over a temperature range, for example room temperature (RT) to about 550° C.].

In embodiments, the spray dried catalyst is prestabilized at a temperature below this phase change temperature prior to calcination. It is proposed that the Si—O—Si—K species introduced into the iron slurry undergoes dramatic restructuring on drying. In embodiments, water is used sparingly to inhibit shrinking of the catalyst on drying. In embodiments, a stepwise increase in calcination temperature is used to prevent/minimize reduction in surface area. For instance, in embodiments, the catalyst is prestabilized by heating at a first (relatively low) temperature prior to calcination at a (relatively high) calcination temperature. In embodiments, the catalyst is prestabilized at a temperature in the range of from about 100° C. to about 150° C. In embodiments, the spray dried catalyst is prestabilized at a temperature in the range of from about 120° C. to about 150° C. In embodiments, spray dried catalyst is prestabilized overnight, before increasing to full calcinations conditions, to set the catalyst structure. Without wishing to be limited by theory, prestabilizing the precipitated catalyst at a lower temperature prior to calcination may minimize pore loss to a loss of micropores upon calcining, resulting in improved catalyst surface area.

In specific embodiments the catalyst is prestabilized at 140° C. for 4 hours, the temperature is increased at a rate in the range of from about 0.5° C./min to about 2° C./min to a temperature of greater than about 200° C. and the catalyst calcined for 4 hours, the temperature is then increased at a rate in the range of from about 0.5° C./min to about 2° C./min, and the catalyst calcined at 300° C. for 4 hours. In some embodiments, the catalyst is calcined at a temperature of about 320° C. for a period of about 4 hours. In certain embodiments, the catalyst is calcined at a temperature of about 350° C. for a period of about 4 hours. In other embodiments, the catalyst is calcined at a temperature of about 380° C. for a period of about 4 hours.

In embodiments, calcining at 600 comprises (a) increasing to 140° C. (from, for example room temperature) at a rate of about 0.5° C./min and dwelling for 4 hours at this temperature; (b) increasing from 140° C. to 200° C. at a rate of about 0.5° C./min and dwelling for 4 hours at this temperature; (c) increasing from 200° C. to 300° C. at a rate of about 0.5° C./min and dwelling for 4 hours at this temperature; and (d) decreasing to a temperature of about 70° C. at a rate of about 5° C./min, or a any combination of one or more of steps (a)-(d).

IIG. Activating.

In embodiments, the calcined catalyst is activated as known to those of skill in the art and/or used in FT conversion of synthesis gas to produce liquid hydrocarbons. In embodiments, the catalyst is activated in hydrogen. Many different activating procedures for promoted iron Fischer-Tropsch catalysts have been described in the literature. For example, one of the most definitive studies on activating iron Fischer-Tropsch catalysts for use in fixed-bed reactors was published by Pichler and Merkel. (United States Department of Interior Bureau of Mines, Technical Paper 718, By H. Pichler and H. Merkel, Translated by Ruth Brinkley with Preface and Foreword by L. J. E. Hofer, United States Government Printing Office, Washington, D.C., 1949, Chemical and Thermomagnetic Studies on Iron Catalysts For Synthesis of Hydrocarbons). In this study, high activity of the catalyst was correlated with the presence of iron carbides after the activation procedure. The most effective procedure reported utilized carbon monoxide at 325° C. at 0.1 atm pressure. The study also showed how the presence of copper and potassium in the catalyst affected activation of the catalyst.

In embodiments, spray dried catalyst is activated by any means known to one of skill in the art. In embodiments, the catalyst is pre-treated in hydrogen. In embodiments, the catalyst is pre-treated with a gas comprising carbon monoxide. In some embodiments, the catalyst is activated with substantially 100% CO.

In embodiments, the catalyst is pre-treated in synthesis gas. In embodiments, pre-treatment occurs at preselected conditions of temperature and pressure. In embodiments, these pre-selected conditions of temperature encompass a temperature in the range of from about 250° C. to about 300° C. In embodiments, pre-selected conditions of pressure encompass a pressure in the range of from about 5 atm. to about 10 atm.

In embodiments, as described in U.S. Pat. No. 5,504,118, the activity and selectivity of the catalyst is improved by subjecting the catalyst particles to a hydrogen-rich synthesis gas at elevated temperature and pressure. The reaction of carbiding of the iron catalyst precursor using a hydrogen-rich synthesis gas and the subsequent Fischer-Tropsch reaction both produce water. Without wishing to be limited by theory, it is believed that the presence of this water prevents over-carburization of the catalyst and thereby improves the activity and selectivity of the catalyst. (See "The Influence of Water and of Alkali Promoter on the Carbon Number Distribution of Fischer-Tropsch Products Formed over Iron Catalysts" by L. Konig et al., Ber. Bunsenges. Phys. Chem. 91, 116-121 (1987)-c VHC Verlagsgesellschaft mbH, D-6940 Weinheim, 1987.)

In embodiments, hydrogen-rich synthesis gas is used in lieu of an inert gas for maintaining the catalyst in suspension while the slurry is being heated to approximately 200° C. At this point, the synthesis gas is replaced by an inert gas (nitrogen or carbon dioxide) until the activation temperature has been attained at which time activation is carried out using, for example, synthesis gas, hydrogen or carbon monoxide.

It has been reported in U.S. Pat. No. 5,504,118 that the presence of a large amount (20%) by volume of nitrogen in the synthesis gas used for pretreatment of a precipitated unsupported catalyst had no detrimental effect on the activation procedure. In embodiments, activation occurs in the presence of up to about 20% nitrogen.

In embodiments, the catalyst is activated by contacting the catalyst particles with a mixture of gaseous hydrogen and carbon monoxide at a temperature of from about 250° C. to 300° C., for about 0.5 to 5 hours, optionally a water vapor partial pressure of about 1 psig, and a hydrogen to carbon monoxide mol (or volume) ratio in the range of from about 1.3 to 1.5, the activation being effective to increase the selectivity of the activated catalyst in subsequent formation of liquid hydrocarbons in a Fischer-Tropsch reaction. In embodiments, the syngas for activation has a $H_2$:CO mol ratio of about 1.4. In embodiments, activation in syngas occurs for a time period up to 6 hours.

In embodiments, activation is effected via a 'typhoon' activation method. In embodiments, such catalyst activation is performed by heating the catalyst to 275° C. in nitrogen, feeding syngas at a $H_2$:CO ratio of 1.4 once attaining a temperature of 275° C., activating at 275° C. under 140 psig pressure for 4-24 hours (depending on the space velocity). In embodiments, activation is performed at a pressure in the range of from about 14.7 psig to about 175 psig. Activation may be performed at a space velocity in the range of from about 1 to about 6 nL/h/g cat.

In embodiments, activation comprises introducing an inert gas into a reactor comprising a slurry of the catalyst at a first temperature; increasing the reactor temperature from the first temperature to a second temperature at a first ramp rate; introducing synthesis gas having a ratio of $H_2$:CO to the reactor at a space velocity; and increasing the reactor temperature from the second temperature to a third temperature at a second ramp rate. The second temperature may be in the range of from about 150° C. to 250° C.; alternatively, the second temperature may be about 150° C. The third temperature may be in the range of from about 270° C. to 300° C.; alternatively, the third temperature may be about 270° C. The reactor pressure may be maintained in the range of from about 0 psig to about 175 psig during activation; alternatively, in the range of from about 30 psig to about 140 psig. The first ramp rate may be in the range of from about 1° C./min to 5° C./min. The second ramp rate may be in the range of from about 0.2° C./min to 1° C./min; alternatively in the range of from about 0.5° C./min to 1° C./min. The space velocity may be in the range of from about 3 to about 4 nL/h/g Fe. The ratio of $H_2$:CO may be in the range of from about 0.5 to 1.5 during activation.

In embodiments, an iron Fischer-Tropsch catalyst is activated by introducing an inert gas into a reactor comprising a slurry of the catalyst at a first temperature, increasing the reactor temperature from the first temperature to a second temperature at a first ramp rate, wherein the second temperature is in the range of from about 150° C. to 250° C., introducing synthesis gas having a ratio of $H_2$:CO to the reactor at a space velocity, and increasing the reactor temperature from the second temperature to a third temperature at a second ramp rate, wherein the third temperature is in the range of from about 270° C. to 300° C. The reactor pressure may be maintained in the range of from about 0 psig to about 175 psig or in the range of from about 30 psig to about 140 psig during activation. The first ramp rate may be in the range of from about 1° C./min to 5° C./min. The second ramp rate may be in the range of from about 0.2° C./min to 1° C./min. The space velocity may be in the range of from about 1 to about 6 nL/h/g Fe. The ratio of $H_2$:CO may be in the range of from about 0.5 to 1.5. The second temperature may be about 150° C. The third temperature may be about 270° C.

In embodiments, activation is performed in synthesis gas at a temperature in the range of from about 150° C. to about 270° C. for a time period of from about 1 to about 10 hours. The synthesis gas may have a $H_2$:CO ratio in the range of from about 0.7 to about 1.5, from about 0.7 to about 1 or from about 0.77 to about 1. The space velocity for activation may be in the range of from about 1 to about 6 nL/h/g cat.

In embodiments, activation is performed substantially as described in U.S. Pat. No. 5,504,118 and/or U.S. patent application Ser. No. 12/272,960 (now U.S. Pat. No. 7,915,193), the disclosures of each of which are hereby incorporated herein for all purposes not contrary to this disclosure.

IIF. FT Synthesis.

The catalyst of this disclosure may be operated to produce FT hydrocarbons as known in the art. In embodiments, synthesis conditions comprise a pressure in the range of from about 100 psig to about 450 psig and a temperature in the range of from about 150° C. to about 300° C. FT synthesis may be performed at a space velocity in the range of from about 1 to about 6 nL/h/g cat.

III. Catalyst Product

In embodiments, FT catalyst produced via catalyst preparation method 10 comprises weight ratios of chemical promoter alkali metal to catalyst metal (i.e. iron and/or cobalt) in the range of from about 1:100 to about 10:100. In embodiments, the weight ratio of chemical promoter alkali metal to catalyst metal is in the range of from about 2.5:100 to about 5:100. In embodiments, the weight ratio of structural promoter/promoter to catalyst metal is in the range of from about 2:100 to about 24:100. In embodiments, the weight ratio of structural promoter/support to catalyst metal is in the range of from about 6:100 to about 24:100. In specific embodiments, the catalyst slurry comprises about 2.5, 4.2 or 5 K to 100 Fe; and 6, 12 or 24 $SiO_2$ to 100Fe. In alternative embodiments, the catalyst slurry comprises about 2.5, 4.2 or 5 K to 100 Fe; and 6, 12 or 24 $Al_2O_3$ to 100Fe. In embodiments, the catalyst also comprises copper. The weight ratio of copper to catalyst metal (e.g. iron and/or cobalt) can be in the range of from about 1:100 to about 10:100. In embodiments, the catalyst comprises copper and the weight ratio of copper to catalyst metal is in the range of from about 3:100 to about 7:100. In embodiments, the catalyst comprises copper and the weight ratio of copper to catalyst metal is at least, less than, or about 5:100. In some embodiments, the catalyst slurry comprises copper and the weight ratio of copper to catalyst metal (e.g. iron) is substantially the same as the weight ratio of chemical promoter (e.g. alkali metal) to catalyst metal, i.e. in some embodiments, Cu:100Fe is about the same as chemical promoter:100Fe (e.g. K:100Fe). In embodiments, the catalyst metal comprises iron, cobalt, or a combination thereof. In alternative embodiments, the catalyst comprises copper in a dissimilar weight ratio to iron as the ratio of chemical promoter alkali metal to catalyst metal.

In embodiments, FT catalyst produced according to the catalyst preparation method of this disclosure comprises from about 20 to about 70, from about 30 to about 65, or from about 40 to about 65 weight percent catalyst metal selected from cobalt, iron, copper and combinations thereof. In embodiments, FT catalyst produced according to the catalyst preparation method of this disclosure comprises from about 20 to about 70 weight percent iron, from about 30 to about 65 weight percent iron, or from about 40 to about 65 weight percent iron. In embodiments, FT catalyst produced according to the catalyst preparation method of this disclosure comprises from about 0 to about 40 weight percent cobalt, from about 0 to about 30 weight percent cobalt, or from about 0 to about 10 weight percent cobalt. In embodiments, FT catalyst produced according to the catalyst preparation method of this disclosure comprises from about 1 to about 20 weight percent copper, from about 1 to about 10 weight percent copper, or from about 1 to about 5 weight percent copper.

In embodiments, FT catalyst produced according to the catalyst preparation method of this disclosure comprises from about 0 to about 50 weight percent structural promoter, from about 0 to about 35 weight percent structural promoter, or from about 0 to about 25 weight percent structural promoter. In embodiments, FT catalyst produced according to the catalyst preparation method of this disclosure comprises, as structural promoter, from about 0 to about 60 weight percent silica, from about 0 to about 35 weight percent silica, or from about 0 to about 25 weight percent $SiO_2$.

In embodiments, FT catalyst produced according to the catalyst preparation method of this disclosure comprises from about 1 to about 20 weight percent chemical promoter, from about 1 to about 10 weight percent chemical promoter, or from about 1 to about 8 weight percent chemical promoter. In embodiments, FT catalyst produced according to the catalyst preparation method of this disclosure comprises, as chemical promoter, from about 1 to about 20 weight percent potassium, from about 1 to about 10 weight percent potassium, or from about 1 to about 8 weight percent potassium.

In specific embodiments, FT catalyst produced according to the catalyst preparation method of this disclosure comprises from about 20 to about 70 weight percent iron, from about 1 to about 20 weight percent copper, from about 0 to about 35 weight percent silica, and from about 1 to about 20 weight percent potassium. In embodiments, the FT catalyst comprises from about 30 to about 65 weight percent iron, from about 1 to about 10 weight percent copper, from about 0 to about 35 weight percent silica, and from about 1 to about 10 weight percent potassium. In embodiments, the catalyst comprises from about 40 to about 65 weight percent iron, from about 1 to about 8 weight percent copper, from about 0 to about 25 weight percent silica, and from about 1 to about 8 weight percent potassium.

In embodiments, iron silicates, such as $Fe_2SiO_4$ which are very difficult to reduce (generally reducible only at temperatures greater than about 700° C.) are not formed to any significant extent by catalyst preparation method 10. In embodiments, the catalyst produced via catalyst preparation method 10 is reducible at temperatures of less than about 272° C. In embodiments, the catalyst is reducible at temperatures in the range of from about 210° C. to about 350° C. In embodiments, the catalyst is reducible at temperatures in the range of from about 210° C. to about 280° C. In embodiments, the catalyst is reducible at temperatures in the range of from about 210° C. to about 240° C.

In embodiments, catalyst produced via method 10 exhibits improved attrition resistance when compared to conventional precipitated unsupported FT catalyst. In embodiments, uncalcined catalyst produced via the method of this disclosure (e.g. dried at 100° C.) shows substantially no attrition deterioration after at least 5 hours of an ASTM Air Jet Attrition evaluation. In embodiments, following calcination, FT catalyst produced via method 10 produces from about 2.7 to about 6.3 weight percent fines after 5 hour ASTM Air Jet Attrition evaluation. In embodiments, after 5 hours ASTM Air Jet Attrition evaluation, the catalyst of the present disclosure produces less than about 7 weight percent fines. In embodiments, after 5 hours ASTM Air Jet Attrition evaluation, FT catalyst produced via the method of this disclosure produces less than about 6 wt % fines. In embodiments, after 5 hours ASTM Air Jet Attrition evaluation, the FT catalyst of the present disclosure produces less than about 4, 3, 2 or 1 wt % fines.

The ASTM Air Jet Attrition test is likely harsh compared to the actual flow dynamics encountered by FT catalyst during utilization in a slurry bed FT reactor. Therefore, catalyst may also be examined using a modified attrition test, referred to herein as RCA. For the RCA test, a small quantity of activated catalyst is placed in oil in a vertical stainless steel column. Nitrogen or air is bubbled up through the column at a specified velocity. The column operates at atmospheric pressure and ambient temperature. Small samples are taken from the column at specified time intervals and analyzed for particle size distribution. The results for a test catalyst can be compared to results for a control catalyst. FT catalyst produced via catalyst preparation method 10 of this disclosure may exhibit reduced production of fines when subjected to the RCA test. In embodiments, prior to activation, FT catalyst produced according to this disclosure exhibits less than or about 1.5 wt %, less than or about 1 wt %, or less than or about 0.9 wt % particles having a size of less than 10 micron. In embodiments, subsequent to activation, FT catalyst produced according to this disclosure exhibits less than or about 1.5 wt %, less than or about 1.4 wt %, less than or about 1.3 wt %, less than or about 1.2 wt % or less than or about 1.1 wt % particles having a size of less than 10 micron.

In embodiments, prior to activation, FT catalyst produced according to this disclosure exhibits less than or about 7 wt %, less than or about 6.5 wt %, or less than or about 6.3 wt % particles having a size of less than 20 micron. In embodiments, subsequent to activation, FT catalyst produced according to this disclosure exhibits less than or about 8.5 wt %, less than or about 8.0 wt %, less than or about 7.5 wt % or less than or about 7.4 wt % particles having a size of less than 20 micron.

In embodiments, prior to activation, FT catalyst produced according to this disclosure exhibits from about 35 wt % to about 45 wt %, from about 40 wt % to about 45 wt %, from about 40 wt % to about 43 wt %, or about 41 wt % particles having a size less than 40 micron. In embodiments, subsequent to activation, FT catalyst produced according to this disclosure exhibits from about 45 wt % to about 55 wt %, from about 50 wt % to about 55 wt %, from about 50 wt % to about 53 wt %, or about 51-52 wt % particles having a size less than 40 micron.

A first catalyst attrition index, RCAI-10, is defined herein as (the percentage of particles having particle size less than 10 microns after activation minus the percentage of particles having a particle size less than 10 microns before activation)/(100 minus percentage of particles having a particle size less than <10 microns before activation)*100; RCAI-10 thus indicates the percentage of particles having a particle size less than 10 microns. A second catalyst attrition index, RCAI-20, is defined herein as (the percentage of particles having a particle size less than 20 microns after activation minus the percentage of particles having a particle size less than 20 microns before activation)/(100 minus the percentage of particles having a particle size less than 20 microns before activation)*100; RCAI-20 thus indicates the percentage of particles having a particle size less than 20 microns. A third catalyst attrition index, RCAI-40, is defined herein as (the percentage of particles having a particle size less than 40 microns after activation minus the percentage of particles having a particle size less than 40 microns before activation)/(100 minus the percentage of particles having a particle size less than 40 microns before activation)*100; RCAI-40 thus indicates the percentage of particles having a particle size less than 40 microns.

FT catalyst produced via catalyst preparation method 10 may exhibit a 10 micron Chemical Attrition Index (RCAI-10) of less than or about 2.5, 1.5, 1.0, 0.7, 0.6, 0.5, 0.4, 0.3 or less than or about 0.2. FT catalyst produced via catalyst preparation method 10 may exhibit a 20 micron Chemical Attrition Index (RCAI-20) of less than or about 3.5, 3.0, 2.5, 2.0, 1.5 or less than or about 1.2. FT catalyst produced via catalyst preparation method 10 may exhibit a 40 micron Chemical Attrition Index (RCAI-40) of less than or about 25, 20 or less than or about 18.5.

In embodiments, calcined and/or uncalcined FT catalyst produced via catalyst preparation method 10 has a BET surface area in the range of from about 140 $m^2/g$ to about 300 $m^2/g$, from about 175 $m^2/g$ to about 240 $m^2/g$ or from about 180 $m^2/g$ to about 220 $m^2/g$. In embodiments, uncalcined FT catalyst produced via catalyst preparation method 10 has a BET surface area of at least or about 180 $m^2/g$, at least or about 185 $m^2/g$, at least or about 190 $m^2/g$, at least or about 195 $m^2/g$, at least or about 200 $m^2/g$, at least or about 205 $m^2/g$, at least or about 210 $m^2/g$ or at least or about 215 $m^2/g$.

The FT catalyst produced via the method of this disclosure may have a mean size in the range of from about 20 μm to about 150 μm, from about 30 μm to about 90 μm, or from about 40 μm to about 80 μm. In embodiments, the pore volume for FT catalyst produced via the method of this disclosure is greater than or about 0.20 cc/g, 0.30 cc/g, 0.40 cc/g, 0.50 cc/g or 0.55 cc/g. In embodiments, the pore size (e.g. pore radius) for the resultant catalyst is in the range of from about 45 Å to about 90 Å. In embodiments, the pore radius of the disclosed catalyst is in the range of from bout 60 Å to about 90 Å. In embodiments, the disclosed catalyst has a pore radius of at least 45, 50, 55, 60, 65, 70, 75, 80 or 85 Å.

In embodiments, the performance of the FT catalyst of this disclosure does not significantly negatively deviate from conventional catalyst performance (i.e. regarding activity, selectivity and/or effective time on stream). In embodiments, the disclosed catalyst produces a similar or increased quantity of C5+ hydrocarbons per hour per kg catalyst relative to a conventionally precipitated FT catalyst. In embodiments, the FT catalyst of this disclosure exhibits a C5+ selectivity of at least 40%, at least 45%, at least 50%, at least 60% or at least 70% for a time on stream of at least 50, 100, 200, 300, 400 or 500 hours.

In embodiments, the FT catalyst of this disclosure exhibits a CO conversion of at least 60%, 80% or 95% for a time on stream of at least 100 hours, 250 hours, or 500 hours. In embodiments, the FT catalyst of this disclosure exhibits a $CH_4$ selectivity of less than about 1%, 2% or 3% for a time on stream of at least 100 hours, 250 hours, or 500 hours. In embodiments, the FT catalyst of this disclosure exhibits a $CO_2$ selectivity of less than about 35%, 40% or 45% for a time on stream of at least 100 hours, 250 hours, or 500 hours. In embodiments, the FT catalyst of this disclosure exhibits an initial carbon monoxide conversion at reaction of greater than or about 78, 79, 80, 81, 82, 83, 84, 85, 86, 87 or 88 percent.

EXAMPLES

Overview

Fe-based FT catalysts were prepared according to the catalyst preparation method of this disclosure. Preparing metal solution at 100 comprised forming a solution comprising iron and copper nitrates. Iron and copper powders were slurried with DI water. With mechanical stirring, 10% to 30% nitric acid solution was added dropwise to the metal slurry. As the dissolution reaction was exothermic, the addition was controlled based on measured reaction temperature, such that the temperature stayed within the range of from about 30° C. to about 32° C. With intermittent cooling, when about 80% of the nitric acid solution was added, a dark green solution was formed. The solution was heated to 70° C. at a rate of about 3°

C./min and maintained at 70° C. for 45 minutes. Just above 65° C., NOx gases with reddish-brown color were produced for several minutes. During this holding period the mixture changed color from a dark green to a red/brown color.

Precipitating and pH Adjusting at 200 comprised precipitation with sodium carbonate and addition of strong acid during or subsequent precipitation, as indicated in Table 1 for each inventive catalyst. Acid to base precipitation was utilized to precipitate the catalyst, wherein nitric acid solution was added to sodium carbonate. An aqueous $Na_2CO_3$ solution with a concentration 115 g/liter was used as the base. A solution comprising 12.5-25% NaOH was added during the precipitation or after the precipitation as indicated in Table 1 in order to maintain the slurry pH at the values also indicated in Table 1.

The precipitate was thoroughly washed at 300 in order to remove sodium for $Na_2CO_3$ precipitated slurry and $NO_3$ for $NH_4OH$ precipitated slurry and thus produce a washed filter cake slurry.

The inventive catalysts were promoted at step 400 via double promotion, in which fumed silica was slowly, in portions, added to a potassium hydroxide solution comprising 45% aqueous KOH (KOH dissolved in DI water), ensuring it was well dispersed and no lumps were formed. The support solution was well mixed for 24 hours. The promoter support solution was then added to the washed filter cake slurry in an amount of 9.7 g $SiO_2$ per 80.7 g Fe.

A Type H, MOBILE NIRO spray dryer was utilized to spray dry the catalyst at step 500. The inlet temperature was 370±2° C. The outlet temperature was 75±2° C. The slurry solids content was 16±1%. The water setup flow was 4.0 to 4.5 kg/h (feed flow was set with water and then switched to catalyst slurry). The atomizer air flow was 1 bar with a 30% setting on a variable area flow meter.

All of the inventive catalysts were calcined at step 600. Calcination was performed at 300° C. for 4 to 10 hours. In detail, calcining at 600 comprised (a) increasing to 140° C. (from, for example room temperature) at a rate of about 0.5° C./min and dwelling for 4 hours at this temperature; (b) increasing from 140° C. to 200° C. at a rate of about 0.5° C./min and dwelling for 4 hours at this temperature; (c) increasing from 200° C. to 300° C. at a rate of about 0.5° C./min and dwelling for 4 hours at this temperature; and (d) decreasing to a temperature of about 70° C. at a rate of about 5° C./min.

Example 1

The BET surface areas, pore volumes and pore radii of inventive and comparative catalysts were determined with a Quanta Chrome BET Analyzer. The results presented in Table 1 were obtained from inventive catalysts IC1, IC2 and IC3 and comparative catalysts CC1, CC2 and CC3.

Inventive catalyst 1, IC1, was formed using $Na_2CO_3$ precipitation where the final precipitate pH was 6.9. After precipitation, the pH of the slurry was adjusted to a pH of 10.5 using 25 wt % NaOH. Inventive catalyst IC1 had the composition $100Fe/5Cu/4.2K/12SiO_2$. Inventive catalyst 2, IC2, was formed using $Na_2CO_3$ precipitation where the final precipitate pH was 6.9. After precipitation, the pH of the slurry was adjusted to 13 using 25 wt % NaOH. The amount of NaOH used in forming IC2 was twice that used in forming IC1. Inventive catalyst 2, IC2, had the composition $100Fe/5Cu/4.2K/12SiO_2$. Inventive catalyst 3, IC3, was formed using $Na_2CO_3$ precipitation where NaOH was added during precipitation to adjust the pH to 8.98. Inventive catalyst 3, IC3, had the composition of $100Fe/5Cu/4.2K/12SiO_2$.

Comparative catalyst 1, CC1, was prepared using $Na_2CO_3$ precipitation (acid to base) where the final precipitate pH was 6.9. No additional base was added. Comparative catalyst 1, CC1, also had the composition $100Fe/5Cu/4.2K/12SiO_2$. Comparative catalyst 2, CC2, was formed using NaOH precipitation where the final precipitate pH was 10.3. No additional base was added. Comparative catalyst 2, CC2, also had the composition $100Fe/5Cu/4.2K/12SiO_2$. Comparative catalyst 3, CC3, was formed using $Na_2CO_3$ precipitation (acid to base) where the final precipitate pH was 6.9. No NaOH was added at 200, although pH was adjusted to 10-14 using $NH_4OH$ prior to spray drying at step 500. CC3 also had the composition $100Fe/5Cu/4.2K/12SiO_2$.

TABLE 1

| Catalyst Name | Description | BET Surface Area (m²/g) | Pore Volume (cc/g) | Pore Radius (Å) |
|---|---|---|---|---|
| Inventive Catalyst 1, IC1 | $Na_2CO_3$ precipitated catalyst (acid to base). The final pH of the precipitate was 6.9. NaOH was added after precipitation to adjust the pH to 10.5. The composition of this catalyst is 100 Fe/5Cu/4.2 K/12SiO₂ | 216 | 0.51 | 61.6 |
| Inventive Catalyst 2, IC2 | $Na_2CO_3$ precipitated catalyst (acid to base). The final pH of the precipitate was 6.9. NaOH was added after precipitation to adjust the pH to 13. The amount of NaOH was double of the amount of IC1. The composition of this catalyst is 100 Fe/5Cu/4.2 K/12SiO₂ | 216 | 0.55 | 86.7 |
| Inventive Catalyst 3, IC3 | $Na_2CO_3$ precipitated catalyst (acid to base). NaOH was added from the beginning of precipitation to maintain precipitation pH at ~9. The composition of this catalyst is 100 Fe/5Cu/4.2 K/12SiO₂ | 198 | 0.40 | 48.1 |
| Comparative Catalyst 1, CC1 | $Na_2CO_3$ precipitated catalyst (acid to base). The final pH of the precipitate was 6.9. No other base was added. The composition of this catalyst is 100 Fe/5Cu/4.2 K/12SiO₂ | 192 | 0.49 | 61.8 |
| Comparative Catalyst 2, CC2 | NaOH precipitated catalyst. The final pH of the precipitate was 10.3. The composition of this catalyst is 100 Fe/5Cu/4.2 K/12SiO₂ | 218 | 0.38 | 28.4 |
| Comparative Catalyst 3, CC3 | $Na_2CO_3$ precipitated catalyst (acid to base). The final pH of the precipitate was 6.9. No NaOH, pH was adjusted using $NH_4OH$ before spray drying. The composition of this catalyst is 100 Fe/5Cu/4.2 K/12SiO₂ | 183 | 0.55 | 61.7 |

Example 2

Figure 6:
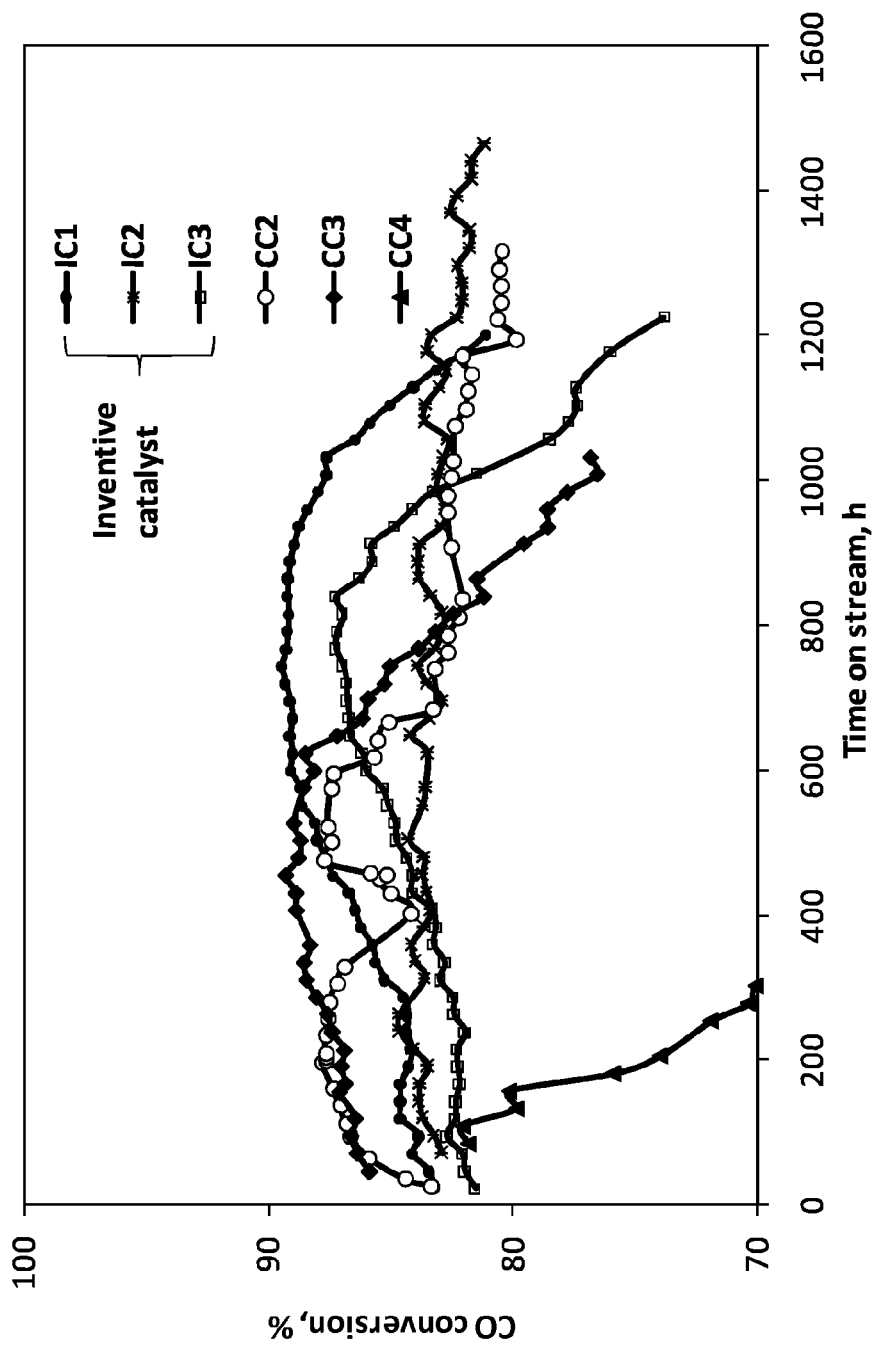
FIG. 6 is a plot of carbon monoxide conversion (percent) as a function of time on stream for inventive catalysts IC1, IC2 and IC3 and comparative catalysts CC2, CC3 and CC4.

Experiments were performed to determine the particle size distributions of various inventive and comparative catalysts before and after CSTR activation. Activation was performed by as indicated in Tables 3 and 4. The catalysts were also subjected to the RCA test described hereinabove to determine the Chemical Attrition Indices, RCAI-10, RCAI-20 and RCAI-40. Inventive catalyst IC3 and comparative catalyst CC3 were prepared as described in Example 1 hereinabove. Comparative catalyst 4, CC4, and comparative catalyst 5, CC5, were prepared by $NH_4OH$ and had the composition 100Fe/4Cu/3K/5SiO$_2$. Table 2 shows the results of the experiments of Example 2, presenting the percentages of catalyst particles having sizes less than 10 μm, less than 20 μm, and less than 40 μm, along with the Chemical Attrition Indices, RCAI-10, RCAI-20 and RCAI-40.

and IC3. FIG. 6 is a plot of carbon monoxide conversion (percent) as a function of time on stream for inventive catalysts IC1, IC2 and IC3. For comparison, results obtained for comparative catalysts CC2, CC3 and CC4 are also presented in FIG. 6.

TABLE 2

| Catalyst | % < 10 μm Before Activation | % < 10 μm After Activation | % < 20 μm Before Activation | % < 20 μm After Activation | % < 40 μm Before Activation | % < 40 μm After Activation | *RCAI RCAI-10 | *RCAI RCAI-20 | *RCAI RCAI-40 |
|---|---|---|---|---|---|---|---|---|---|
| IC3 | 0.9 | 1.1 | 6.3 | 7.4 | 40.7 | 51.5 | 0.2 | 1.2 | 18.2 |
| CC3 | 0.7 | 1.4 | 6.3 | 6.4 | 48.6 | 60.7 | 0.7 | 0.1 | 23.5 |
| CC4 | 2.4 | 4.6 | 4.4 | 7.4 | 17.3 | 24.5 | 2.3 | 3.1 | 8.7 |
| CC5 | 0.8 | 2.2 | 1.9 | 4.2 | 8.7 | 14.8 | 1.4 | 2.3 | 6.7 |

*RCAI—Rentech Chemical Attrition Index

Experiment 3

Figure 2:
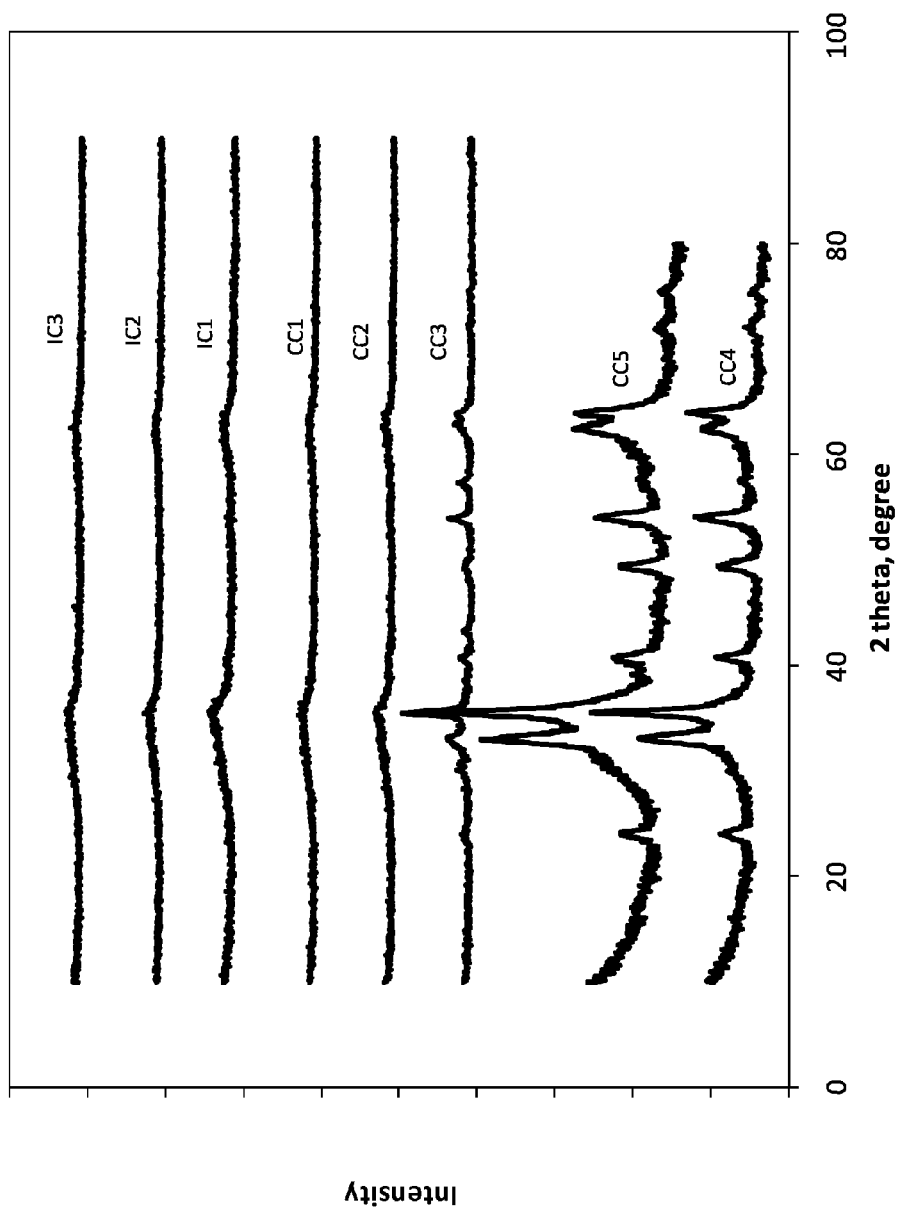
FIG. 2 is a plot of intensity in absorption units (a.u.) as a function of 2θ for inventive catalysts IC1, IC2, and IC3, and comparative catalysts CC1, CC2, CC3, CC4 and CC5.
Figure 3:
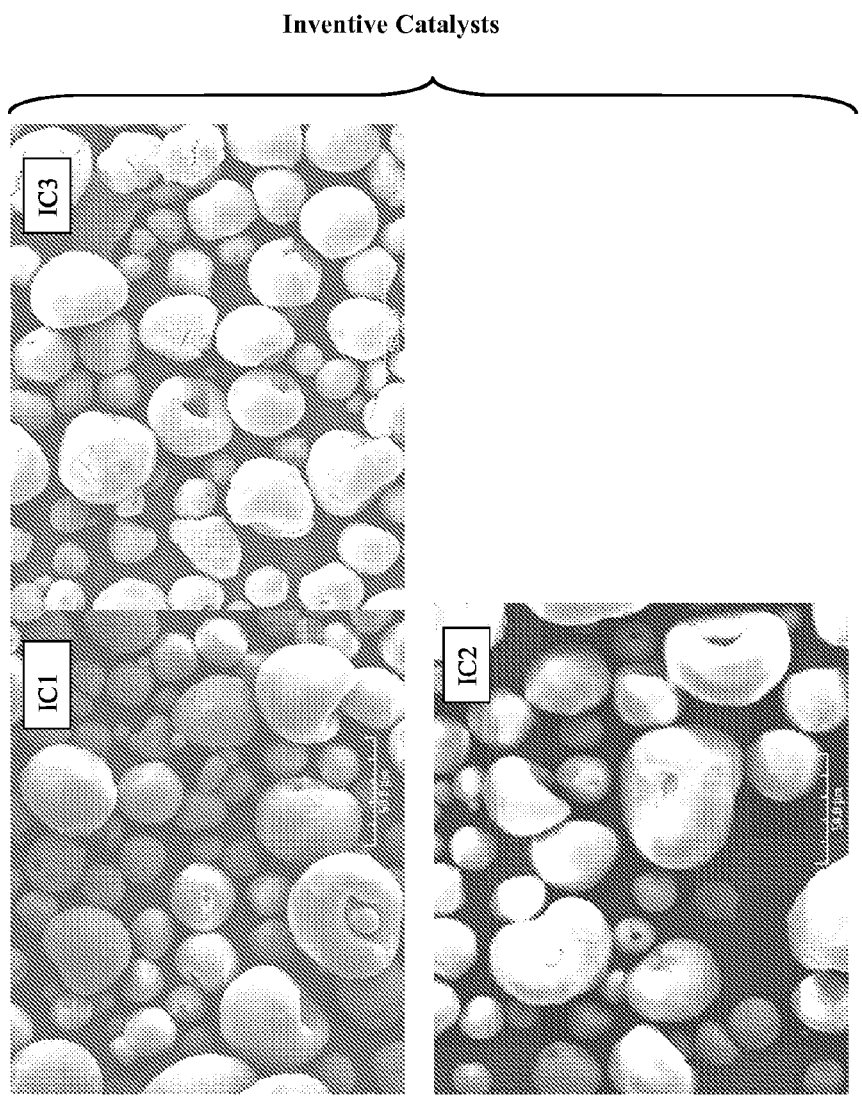
FIG. 3 presents micrographs of inventive catalysts IC1, IC2 and IC3.
Figure 4:
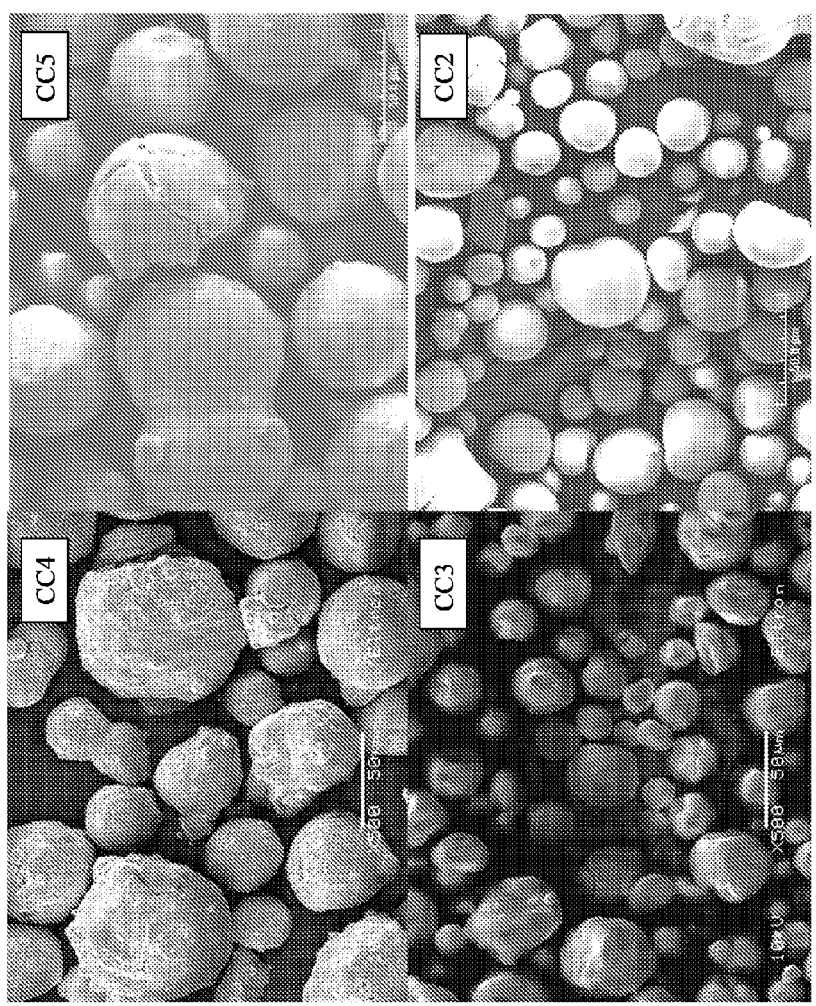
FIG. 4 presents micrographs of comparative catalysts CC2, CC3, CC4 and CC5.

FIG. 2 is a plot of intensity in absorption units (a.u.) as a function of 2θ as determined by XRD for inventive catalysts IC1, IC2, and IC3, and comparative catalysts CC1, CC2, CC3, CC4 and CC5. FIG. 3 presents micrographs of inventive catalysts IC1, IC2 and IC3. For comparison, FIG. 4 presents micrographs of comparative catalysts CC2, CC3, CC4 and CC5. The photographs in FIGS. 3 and 4 were obtained by SEM.

Experiment 4

Inventive catalysts IC1 and IC2 and comparative catalysts CC1, CC2 and CC4 were utilized in FT synthesis to produce liquid hydrocarbons from synthesis gas. Conditions for activation in CSTR and reaction for various experiments are presented in Tables 3 and 4.

Figure 7:
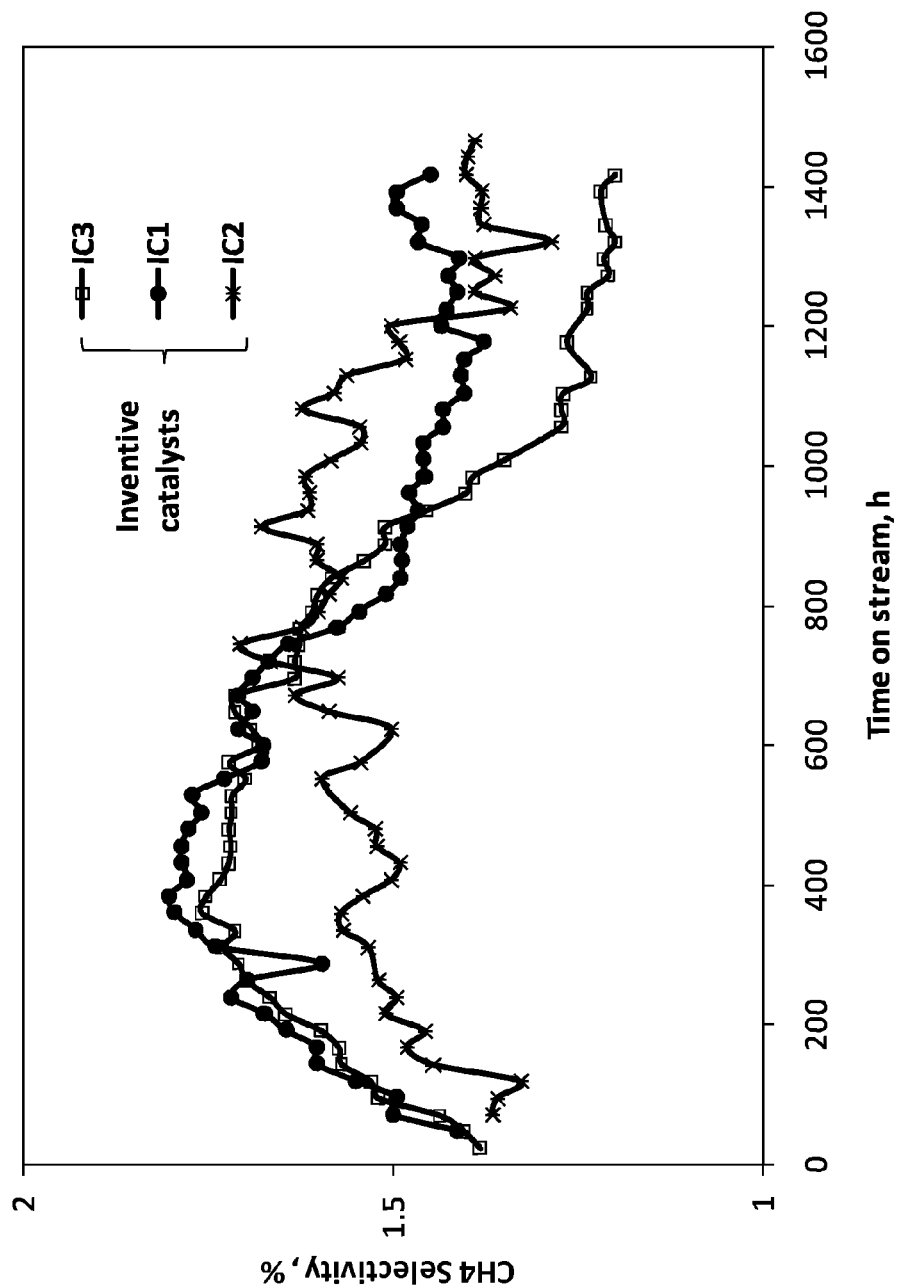
FIG. 7 is a plot of methane selectivity (percent) as a function of time on stream for inventive catalysts IC1, IC2 and IC3.
Figure 8:
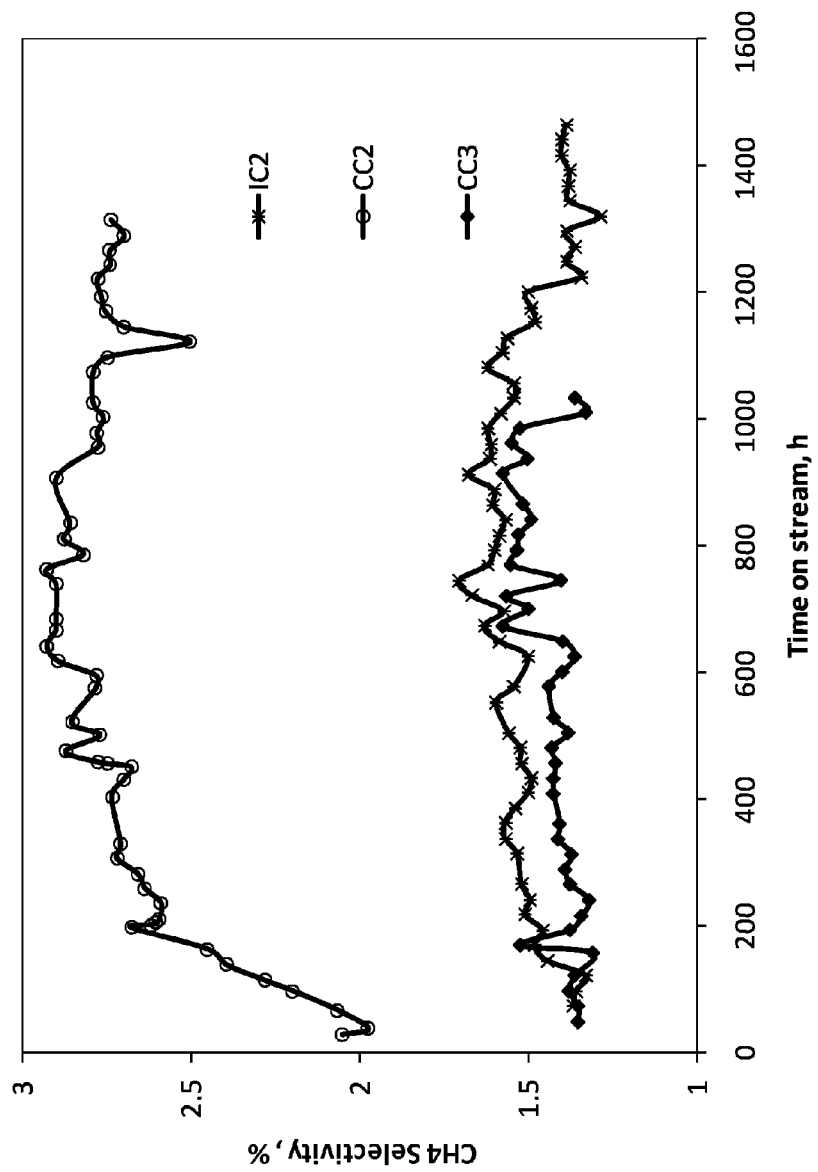
FIG. 8 is a plot of methane selectivity (percent) as a function of time on stream for inventive catalyst IC2 and comparative catalysts CC2 and CC3.

FIG. 7 is a plot of methane selectivity (percent) as a function of time on stream for inventive catalysts IC1, IC2 and IC3. FIG. 8 is a plot of methane selectivity (percent) as a function of time on stream for inventive catalyst IC2. For comparison, results obtained in a similar experiment for comparative catalysts CC2 and CC3 are also presented in FIG. 8.

Figure 9:
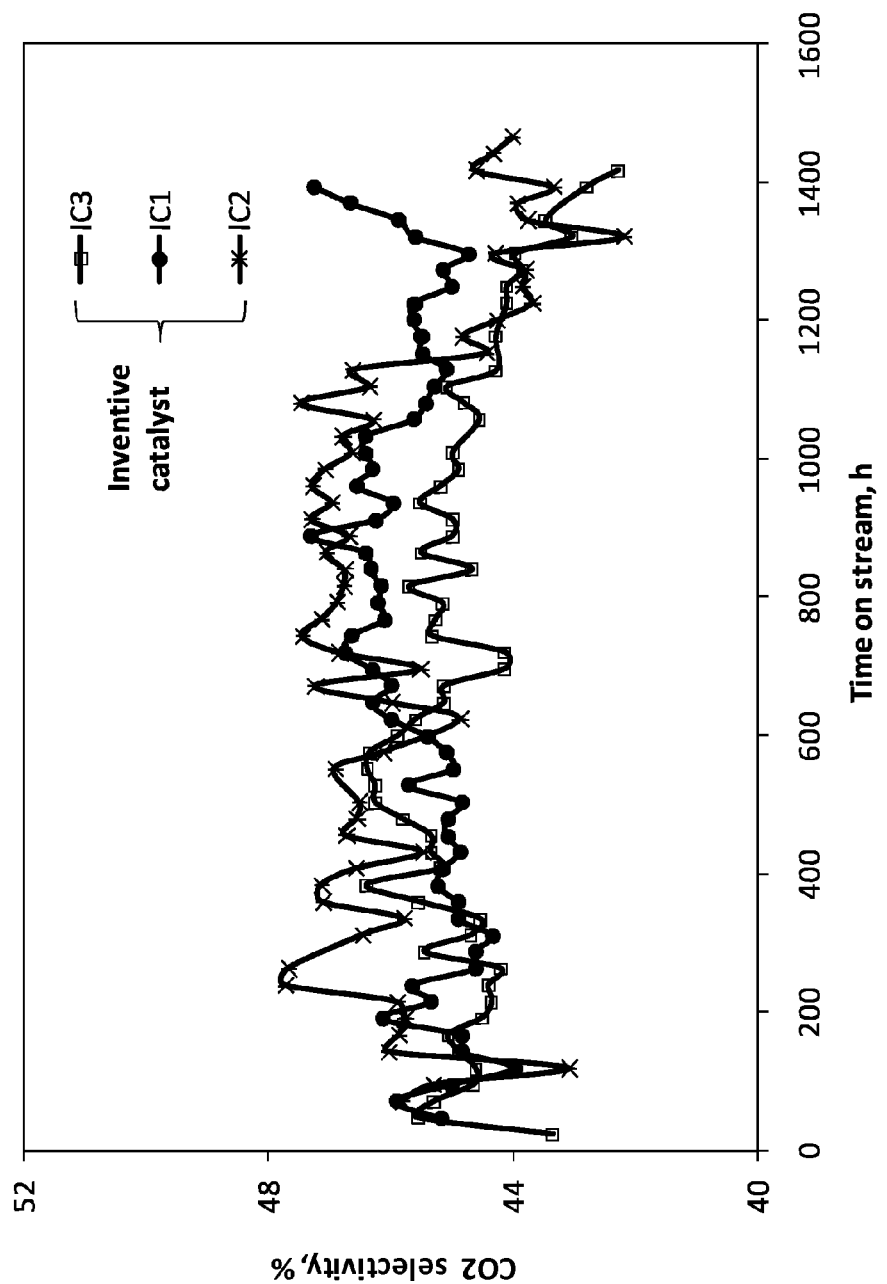
FIG. 9 is a plot of carbon dioxide selectivity (percent) as a function of time on stream for inventive catalysts IC1, IC2 and IC3.
Figure 10:
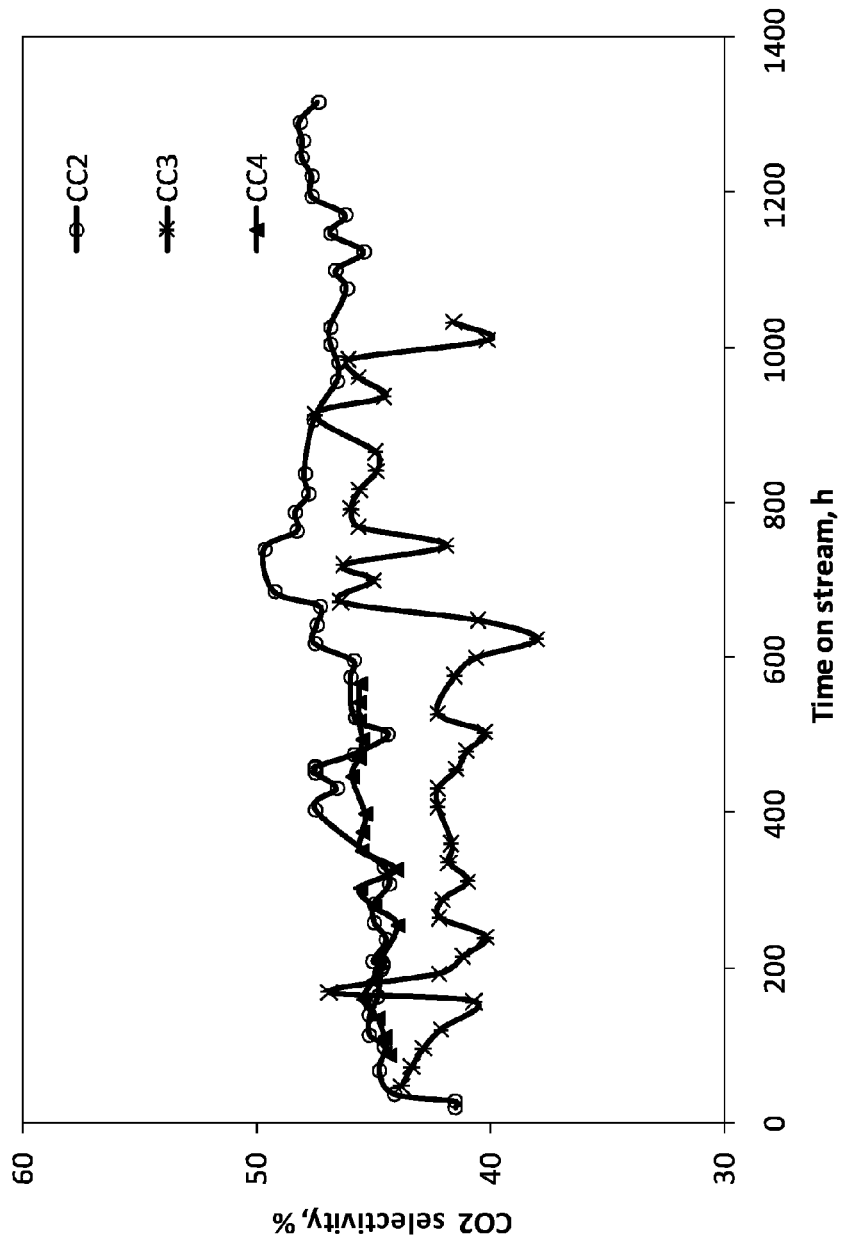
FIG. 10 is a plot of carbon dioxide selectivity (percent) as a function of time on stream for comparative catalysts CC2, CC3 and CC4.

FIG. 9 is a plot of carbon dioxide selectivity (percent) as a function of time on stream for inventive catalysts IC1, IC2 and IC3. For comparison, results obtained in a similar experiment for comparative catalysts CC2, CC3 and CC4 are presented in FIG. 10.

Figure 11:
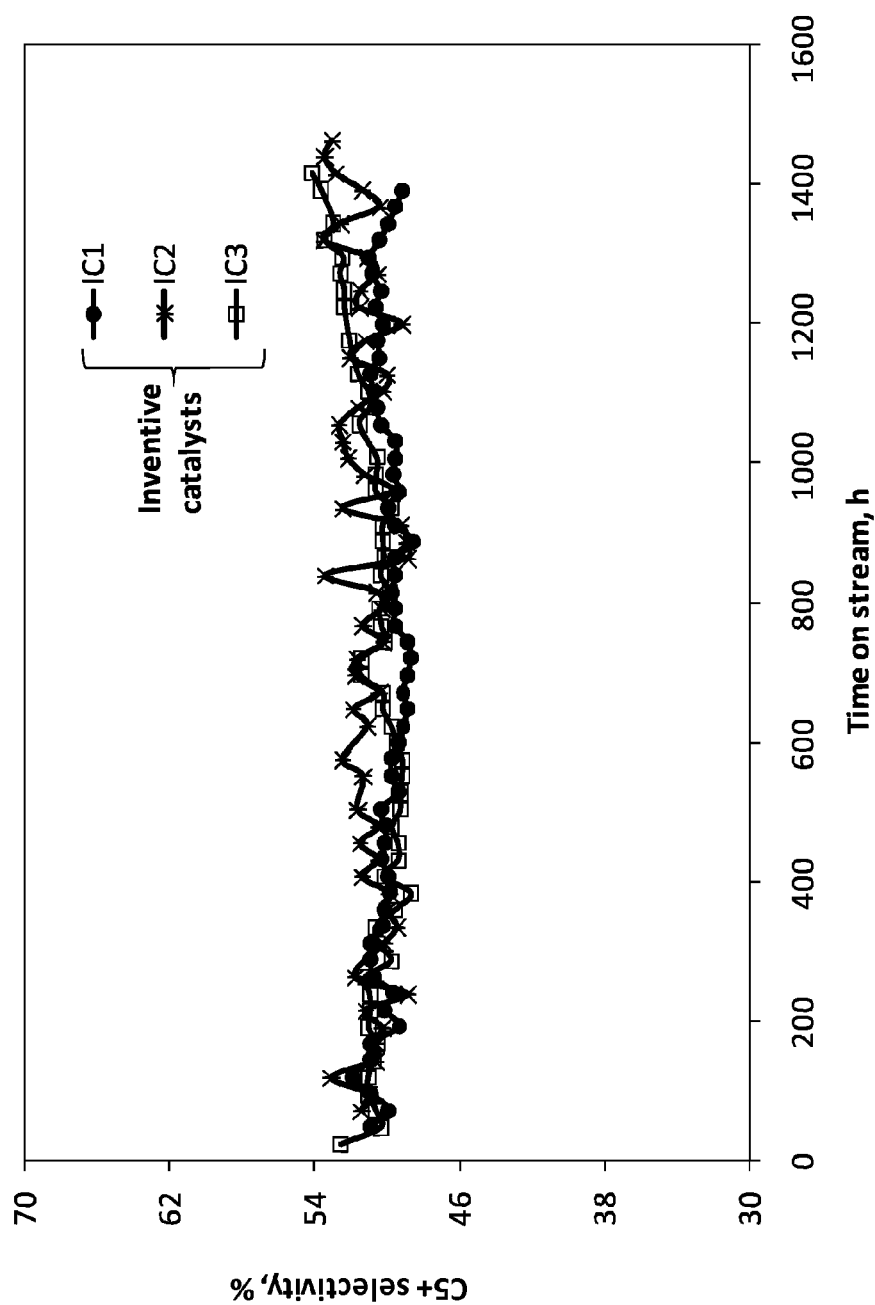
FIG. 11 is a plot of the C5+ selectivity (percent) as a function of time on stream for inventive catalysts IC1, IC2 and IC3.
Figure 12:
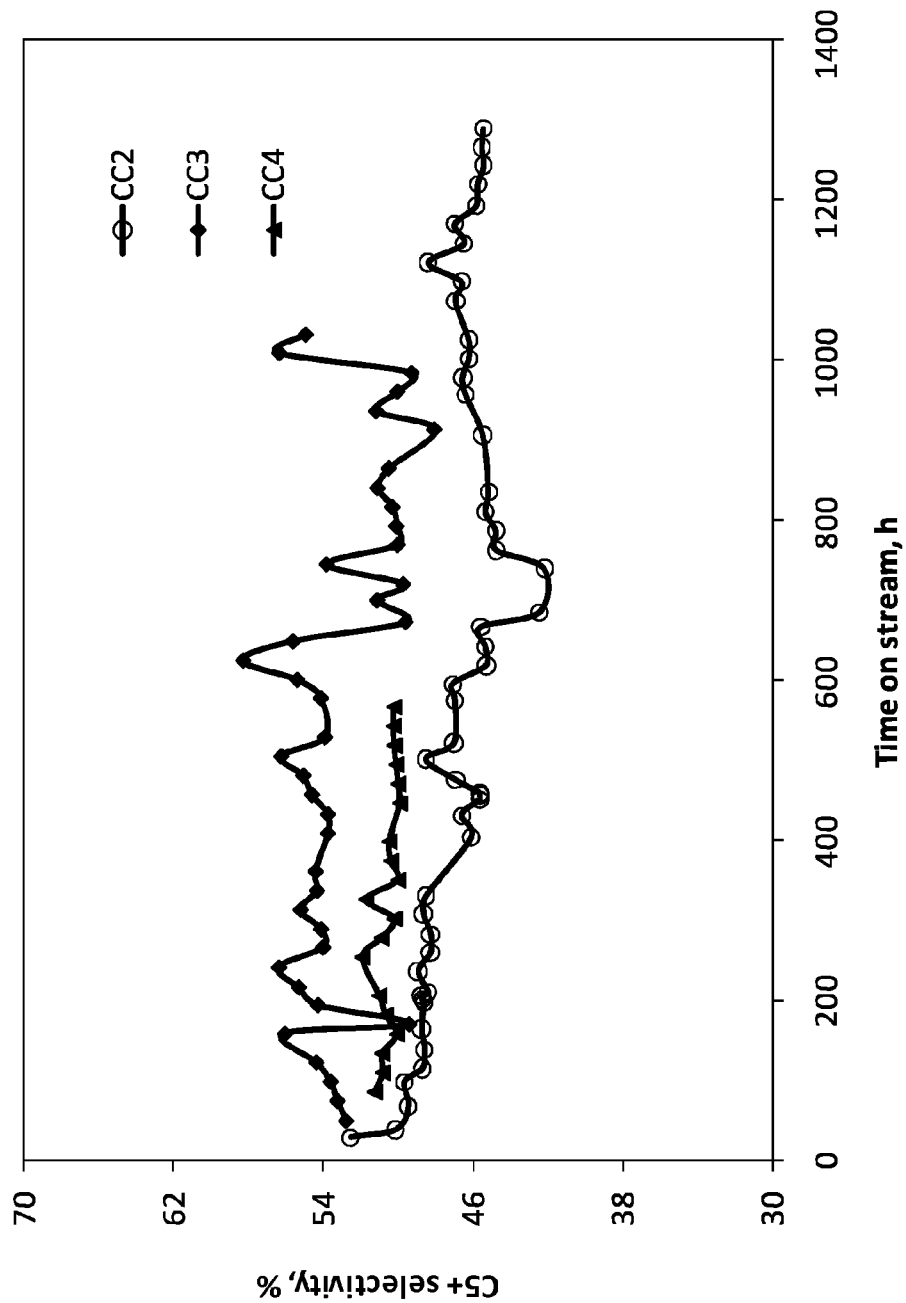
FIG. 12 is a plot of the C5+ selectivity (percent) as a function of time on stream for comparative catalysts CC3 and CC4.

FIG. 11 is a plot of the C5+ selectivity (percent) (selectivity to hydrocarbons having at least 5 carbon atoms) as a function of time on stream for inventive catalysts IC1, IC2 and IC3. For comparison, results obtained in a similar experiment for comparative catalysts CC2, CC3 and CC4 are presented in FIG. 12. The results in FIGS. 5 through 12 were obtained by CSTR.

TABLE 3

| Catalyst | Activation SV (nL/h/g cat) | Activation Hold Time (h) | Reaction Conditions SV (nL/h/g cat) | Reaction Conditions Initial CO Conv (%) | TOS (h) | d32 (μm) | Mean Size (μm) | Horiba Median Size (μm) | Vol % < 10 μm | Vol % < 10 μm, fresh | Vol % < 20 μm, fresh |
|---|---|---|---|---|---|---|---|---|---|---|---|
| IC1 | 1.20 | 4 | 2.75 | 83 | 108 | 33 | 37.1 | 35 | 0.9 | 0.0 | 1.7 |
| IC1 | 1.90 | 10 | 2.51 | 88 | 140 | 16 | 33.2 | 33 | 10.8 | 0.0 | 0.0 |
| CC1 | 1.90 | 10 | 2.63 | 88 | 140 | 29 | 34.4 | 33 | 2.8 | 0.1 | 5.9 |
| CC2 | 1.90 | 10 | 2.63 | 78 | 100 | 13 | 27.3 | 26 | 14.7 | 0.0 | 8.7 |
| CC2 | 1.90 | 10 | 2.63 | 81 | 140 | 32 | 33.3 | 32 | 0.3 | 0.0 | 0.0 |

TABLE 4

| Catalyst | Activation T, °C. | Activation P, psig | Activation SV (nL/h/g cat) | Activation Hold Time (h) | Reaction Conditions SV (nL/h/g cat) | Reaction Conditions H$_2$/CO | Initial CO Conv. % @ Rxn | TOS (h) | Horiba d32 Size (μm) | Horiba Mean Size (μm) | Horiba Vol % < 10 μm |
|---|---|---|---|---|---|---|---|---|---|---|---|
| IC1 | 270 | 140 | 1.90 | 10 | 2.63 | 1.00 | 87 | 890 | 7.4 | 21.0 | 37.7 |
| IC2 | 270 | 140 | 1.40 | 10 | 2.63 | 0.77 | 83 | 1040 | 7.0 | 7.1 | 91.0 |
| IC2 | 270 | 140 | 1.90 | 10 | 2.63 | 0.77 | 83 | 1460 | 5.4 | 15.3 | 35.4 |
| CC2 | 270 | 140 | 1.90 | 10 | 2.51 | 1.00 | 77 | 1315 | 8.8 | 21.3 | 22.3 |
| CC4 | 265 | 70 | 0.73 | 5 | 2.63 | 1.00 | 86 | 925 | 7.8 | 8.5 | 73.1 |

Figure 5:
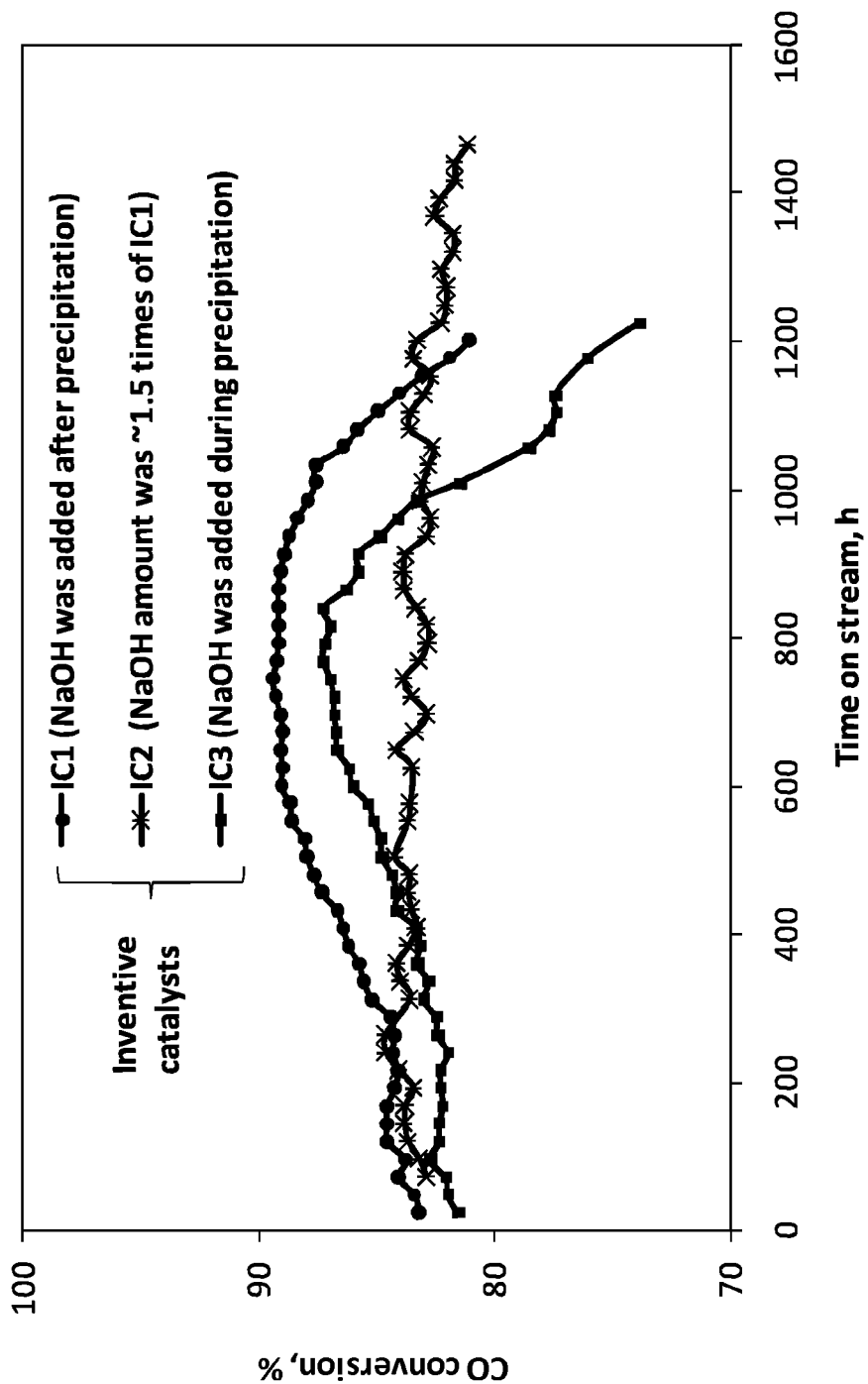
FIG. 5 is a plot of carbon monoxide conversion (percent) as a function of time on stream for inventive catalysts IC1, IC2 and IC3.

FIG. 5 is a plot of carbon monoxide conversion (percent) as a function of time on stream for inventive catalysts IC1, IC2

While the preferred embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The discussion of a reference is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

What is claimed is:

1. A method of forming a Fischer-Tropsch catalyst, the method comprising:
providing at least one metal nitrate solution;
combining each of the at least one metal nitrate solutions with a precipitating agent to form a precipitation solution and to precipitate at least one catalyst precipitate therefrom; and
incorporating a strong base during precipitation such that the pH of the precipitation solution is maintained at a value in the range of from about 8 to about 10;
incorporating a strong base immediately subsequent precipitation to form a precipitated slurry having a pH in the range of from about 9 to about 13.5; or adding a strong base both during and subsequent precipitation such that the pH of the precipitation solution is maintained at a value in the range of from about 8 to about 10, the pH of the precipitated slurry is adjusted to a pH in the range of from about 9 to about 13.5, or both.

2. The method of claim 1 wherein the metal comprises iron.

3. The method of claim 2 wherein the iron nitrate solution comprises Fe(II)/Fe(III) at a desired ratio.

4. The method of claim 3 wherein the desired ratio of ferrous iron to ferric iron is about 1:3.

5. The method of claim 2 wherein the at least one metal nitrate solution further comprises at least one other metal in addition to iron, and the method further comprises co-precipitating at least one other metal or metalloid from the at least one metal nitrate solution.

6. The method of claim 5 wherein the at least one other metal comprises copper.

7. The method of claim 1 comprising providing at least two metal nitrate solutions, and wherein the method further comprises precipitating at least one other metal or metalloid from a second metal nitrate solution.

8. The method of claim 7 wherein the at least one other metal or metalloid is selected from the group consisting of magnesium, copper, aluminum, silicon, and combinations thereof.

9. The method of claim 7 wherein the second metal nitrate solution comprises copper nitrate.

10. The method of claim 1 wherein the precipitating agent is selected from the group consisting of $NH_4OH$, $(NH_4)_2CO_3$, $NH_4HCO_3$, $NaOH$, $Na_2CO_3$, $NaHCO_3$, $KOH$, $K_2CO_3$, $KHCO_3$, and combinations thereof.

11. The method of claim 1 wherein the strong base is selected from the group consisting of $NaOH$, $KOH$, $NH_4OH$ and combinations thereof.

12. The method of claim 1 wherein incorporating the strong base is the step immediately following precipitating.

13. The method of claim 1 wherein the strong base is incorporated during precipitating.

14. The method of claim 1 wherein the metal comprises iron, the precipitating agent comprises $Na_2CO_3$ and the strong base comprises NaOH.

15. The method of claim 14 further comprising coprecipitating the at least one precipitate from a metal nitrate solution comprising both iron and copper or precipitating a first precipitate from an iron nitrate solution, precipitating a second precipitate from a copper nitrate solution, and combining the first and second precipitates.

16. A catalyst produced by the method of claim 15, comprising from about 1 to about 8 weight percent copper as a reduction promoter.

17. The method of claim 14 further comprising washing the precipitate and promoting the precipitate by contacting the precipitate with a promoter.

18. The method of claim 17 wherein the washed precipitate has a pH greater than 7.

19. The method of claim 17 wherein the promoter comprises KOH.

20. A catalyst produced by the method of claim 19, comprising from about 1 to about 20 weight percent potassium as chemical promoter.

21. The method of claim 1 further comprising washing the at least one precipitate.

22. The method of claim 21 further comprising alkalizing the at least one precipitate with an alkaline material.

23. The method of claim 22 wherein the alkaline material comprises KOH.

24. The method of claim 21 wherein the washed precipitate has a pH greater than 7.

25. The method of claim 1 further comprising promoting the at least one precipitate by contacting the precipitate with a structural promoter.

26. The method of claim 25 wherein the structural promoter comprises liquid potassium silicate, tetraethyl ortho silicate, or a combination thereof.

27. The method of claim 25 wherein the structural promoter has a pH in the range of from about 10 to about 11.

28. A catalyst produced by the method of 1 wherein the metal comprises iron, the precipitating agent comprises $Na_2CO_3$ and the strong base comprises NaOH, and wherein the method further comprises washing the precipitate and promoting the precipitate by contacting the precipitate with a promoter comprising KOH.

29. The catalyst of claim 28 wherein the catalyst is a stable catalyst remaining stable online under FT operating conditions for a time on stream of at least about 100 hours.

30. The catalyst of claim 28 comprising from about 20 to about 70 weight percent iron and from about 1 to about 20 weight percent potassium.

31. The catalyst of claim 30 further comprising from about 1 to about 20 weight percent copper.

32. The catalyst of claim 31 further comprising from about 0.5 to about 35 weight percent silica.

33. The catalyst of claim 28 comprising iron, copper, potassium and silica, wherein the catalyst comprises, per 100 grams of iron, from about 3 to about 8 grams of copper, from about 3 to about 6 grams of potassium and from about 9 to about 25 grams of silica.

34. The catalyst of claim 28 comprising a weight ratios of about 100 iron to about 5 copper, 100 iron to about 4.2 potassium and 100 iron to about 12 silica.

35. The method of claim 1 wherein the precipitation is an acid to base precipitation, wherein at least one metal nitrate solution is added to the precipitating agent to effect precipitation of the at least one catalyst precipitate.

36. The method of claim 1 further comprising double promotion, wherein double promotion comprises adding a structural promoter and a chemical promoter to the at least one catalyst precipitate in a single step.

37. The method of claim 1 wherein the precipitating agent comprises carbonate.

* * * * *